US012661797B2

(12) United States Patent   (10) Patent No.:   US 12,661,797 B2
Liu et al.   (45) Date of Patent:   Jun. 23, 2026

(54) SYSTEMS AND METHODS FOR CONTROLLING AN ON-PREMISES ROBOT THROUGH AN INDUSTRIAL DIGITAL TWIN

(71) Applicant: ROCKWELL AUTOMATION TECHNOLOGIES, INC., Mayfield Heights, OH (US)

(72) Inventors: Xin Liu, Dalian (CN); Fei Li, Dalian (CN); Mengqi Ma, Dalian (CN); Shaochuan Li, Dalian (CN); Zhifeng Xun, Dalian (CN)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 315 days.

(21) Appl. No.: 18/522,973

(22) Filed: Nov. 29, 2023

(65) Prior Publication Data

US 2025/0170720 A1   May 29, 2025

(51) Int. Cl.
B25J 9/16 (2006.01)
B25J 13/06 (2006.01)
G05B 19/4155 (2006.01)

(52) U.S. Cl.
CPC ........... B25J 9/1689 (2013.01); B25J 9/1697 (2013.01); B25J 13/06 (2013.01); G05B 19/4155 (2013.01); *G05B 2219/50391* (2013.01)

(58) Field of Classification Search
USPC ................................................ 700/245–264
See application file for complete search history.

(56) References Cited

U.S. PATENT DOCUMENTS

2018/0131907 A1* 5/2018 Schmirler .......... G05B 23/0216
2021/0255611 A1* 8/2021 McGregor .............. G06T 13/20
(Continued)

FOREIGN PATENT DOCUMENTS

CN   111563446 A   8/2020
CN   111633644 A   9/2020
(Continued)

OTHER PUBLICATIONS

Brian Dunbar and Lillian Gipson, "Blending Reality and Simulation", National Aeronautics and Space Administration, 2012 Technical Excellence, https://www.nasa.gov/aeroresearch/tech-excellence/2012/blending-reality-and-simulation, Aug. 7, 2017, 2 pages.

*Primary Examiner* — Jonathan L Sample
(74) *Attorney, Agent, or Firm* — Fletcher Yoder, P.C.

(57) ABSTRACT
A method includes a twin model management system presenting a video stream captured by a robot in an industrial facility, the video stream presented in a digital twin (DT) of the industrial facility to a user, receiving a user request to select an input device of an industrial machine, the user request provided by the user via the DT when the industrial machine is depicted in the video stream, providing, in the DT responsive to the user request, a list of input devices indicating input device(s) of the industrial machine that are depicted in a video image of the video stream, receiving a user selection provided via the DT that specifies a target input device in the list, generating, responsive to the user selection, control command(s) specifying operation(s) to be performed by the robot to physically interact with the target input device, and transmitting the control command(s) to the robot.

18 Claims, 10 Drawing Sheets

100

(56)          References Cited

U.S. PATENT DOCUMENTS

| | | | | |
|---|---|---|---|---|
| 2021/0394359 | A1* | 12/2021 | Mathieu | B25J 9/163 |
| 2022/0100917 | A1* | 3/2022 | McGregor | G05B 19/41885 |
| 2022/0134556 | A1* | 5/2022 | Osgouei | B25J 9/1682 |
| | | | | 700/245 |
| 2022/0156433 | A1* | 5/2022 | Laane | G05B 19/41885 |
| 2022/0193906 | A1* | 6/2022 | Barry | B25J 9/1664 |
| 2022/0197306 | A1* | 6/2022 | Cella | G05D 1/0297 |
| 2022/0241972 | A1* | 8/2022 | Mcgregor | G05B 19/41885 |
| 2022/0400233 | A1* | 12/2022 | Ha | H04N 7/183 |
| 2022/0410391 | A1* | 12/2022 | Aparicio Ojea | B25J 9/1612 |
| 2023/0012832 | A1* | 1/2023 | Como | G06F 8/65 |
| 2023/0017142 | A1* | 1/2023 | Dunn | H04L 67/12 |
| 2023/0017237 | A1* | 1/2023 | Dunn | G05B 17/02 |
| 2023/0131458 | A1* | 4/2023 | Isonni | B25J 9/1653 |
| | | | | 700/245 |
| 2023/0158679 | A1* | 5/2023 | Wen | G06T 17/00 |
| | | | | 700/259 |
| 2023/0275897 | A1* | 8/2023 | Briant | H04L 63/083 |
| | | | | 726/5 |
| 2023/0278213 | A1* | 9/2023 | Koga | B25J 9/161 |
| | | | | 700/245 |
| 2023/0294277 | A1* | 9/2023 | Yang | B25J 9/1605 |
| | | | | 700/217 |
| 2023/0311323 | A1* | 10/2023 | Szabó | B25J 9/1671 |
| | | | | 700/246 |
| 2023/0330858 | A1* | 10/2023 | Solowjow | B25J 9/1697 |
| 2024/0112369 | A1* | 4/2024 | Gonzalez Aguirre | G06T 7/80 |
| 2024/0198515 | A1* | 6/2024 | Aparicio Ojea | B25J 9/1612 |
| 2024/0208069 | A1* | 6/2024 | Aparicio Ojea | B25J 9/1605 |
| 2024/0319047 | A1* | 9/2024 | Feng | G06F 30/20 |
| 2024/0319713 | A1* | 9/2024 | Ratliff | B25J 9/1661 |
| 2024/0335941 | A1* | 10/2024 | Aparicio Ojea | B25J 9/1697 |
| 2024/0425075 | A1* | 12/2024 | Elliott | G06N 3/08 |
| 2025/0303275 | A1* | 10/2025 | Yadav | A63F 13/355 |

FOREIGN PATENT DOCUMENTS

| | | |
|---|---|---|
| CN | 114789450 A | 7/2022 |
| CN | 115401696 A | 11/2022 |
| EP | 3926564 A1 | 12/2021 |
| KR | 102289745 B1 | 8/2021 |

* cited by examiner

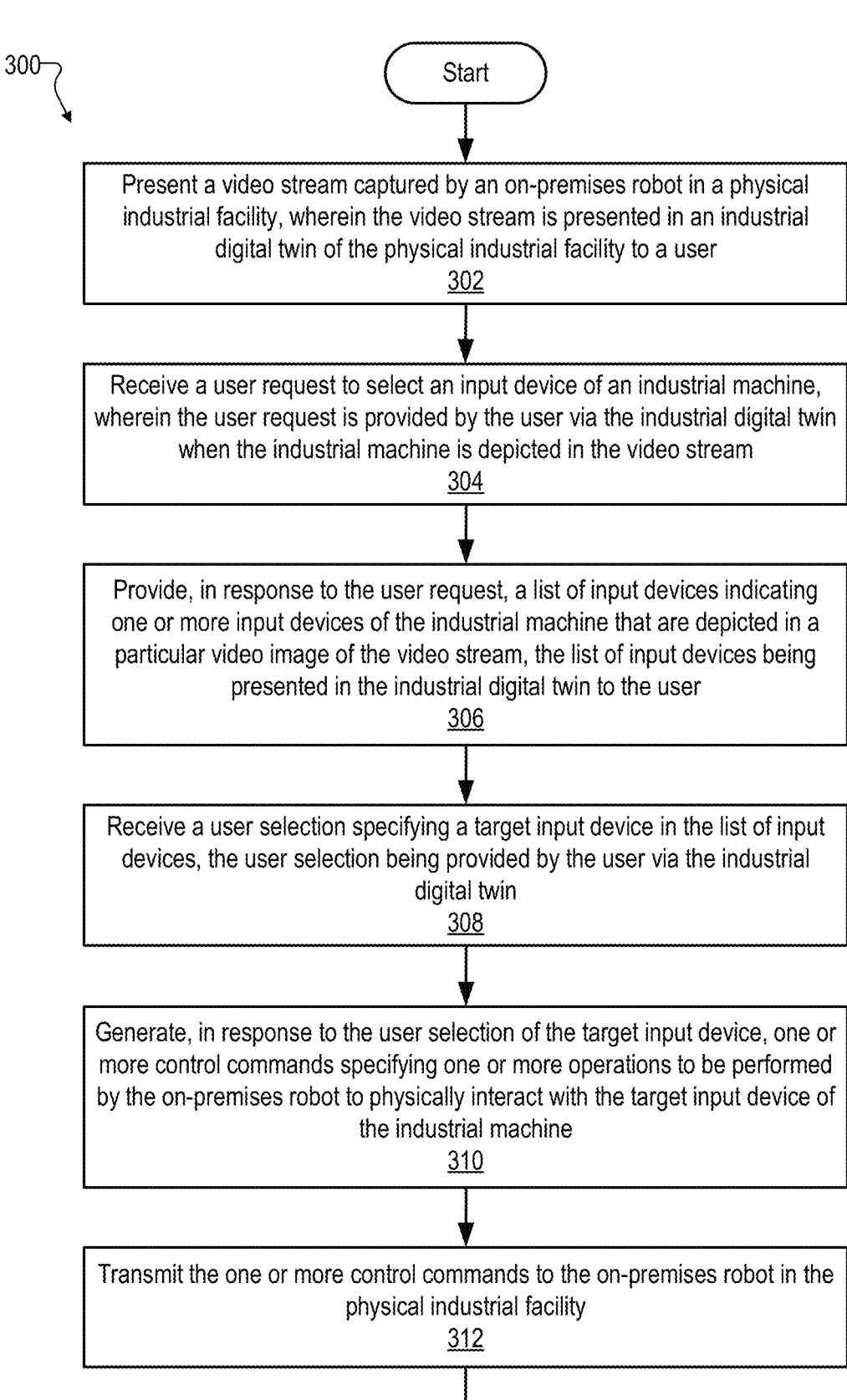

300

Start

Present a video stream captured by an on-premises robot in a physical industrial facility, wherein the video stream is presented in an industrial digital twin of the physical industrial facility to a user
302

Receive a user request to select an input device of an industrial machine, wherein the user request is provided by the user via the industrial digital twin when the industrial machine is depicted in the video stream
304

Provide, in response to the user request, a list of input devices indicating one or more input devices of the industrial machine that are depicted in a particular video image of the video stream, the list of input devices being presented in the industrial digital twin to the user
306

Receive a user selection specifying a target input device in the list of input devices, the user selection being provided by the user via the industrial digital twin
308

Generate, in response to the user selection of the target input device, one or more control commands specifying one or more operations to be performed by the on-premises robot to physically interact with the target input device of the industrial machine
310

Transmit the one or more control commands to the on-premises robot in the physical industrial facility
312

End

FIG. 3

| |
| --- |
| Switch DI1 |
| Switch DI3 |
| Switch DI13 |
| Switch DRIVE PWR |
| Push Button DI6 |
| Push Button DI7 |
| Push Button DI8/DO8 |

SYSTEMS AND METHODS FOR CONTROLLING AN ON-PREMISES ROBOT THROUGH AN INDUSTRIAL DIGITAL TWIN

BACKGROUND

The present disclosure relates to robot control. In a more particular example, the present disclosure relates to technologies for controlling a robot through an industrial digital twin.

BRIEF DESCRIPTION

The following presents a simplified summary in order to provide a basic understanding of some aspects described herein. This summary is not an extensive overview nor is intended to identify key/critical elements or to delineate the scope of the various aspects described herein. The sole purpose of this summary is to present some concepts in a simplified form as a prelude to the more detailed description that is presented later.

In some embodiments, a method is provided. The method comprises presenting, by a twin model management system, a video stream captured by an on-premises robot in a physical industrial facility, wherein the video stream is presented in an industrial digital twin of the physical industrial facility to a user; receiving, by the twin model management system, a user request to select an input device of an industrial machine, wherein the user request is provided by the user via the industrial digital twin when the industrial machine is depicted in the video stream; providing, by the twin model management system in response to the user request, a list of input devices indicating one or more input devices of the industrial machine that are depicted in a particular video image of the video stream, the list of input devices being presented in the industrial digital twin to the user; receiving, by the twin model management system, a user selection specifying a target input device in the list of input devices, the user selection being provided by the user via the industrial digital twin; generating, by the twin model management system in response to the user selection of the target input device, one or more control commands specifying one or more operations to be performed by the on-premises robot to physically interact with the target input device of the industrial machine; and transmitting, by the twin model management system, the one or more control commands to the on-premises robot in the physical industrial facility.

In some embodiments, a system is provided. The system comprises a memory storing instructions; and a processor communicatively coupled to the memory and configured to execute the instructions to: present a video stream captured by an on-premises robot in a physical industrial facility, wherein the video stream is presented in an industrial digital twin of the physical industrial facility to a user; receive a user request to select an input device of an industrial machine, wherein the user request is provided by the user via the industrial digital twin when the industrial machine is depicted in the video stream; provide, in response to the user request, a list of input devices indicating one or more input devices of the industrial machine that are depicted in a particular video image of the video stream, the list of input devices being presented in the industrial digital twin to the user; receive a user selection specifying a target input device in the list of input devices, the user selection being provided by the user via the industrial digital twin; generate, in response to the user selection of the target input device, one or more control commands specifying one or more operations to be performed by the on-premises robot to physically interact with the target input device of the industrial machine; and transmit the one or more control commands to the on-premises robot in the physical industrial facility.

In some embodiments, a non-transitory computer-readable medium is provided. The non-transitory computer-readable medium stores instructions that, when executed, direct a processor of a computing device to: present a video stream captured by an on-premises robot in a physical industrial facility, wherein the video stream is presented in an industrial digital twin of the physical industrial facility to a user; receive a user request to select an input device of an industrial machine, wherein the user request is provided by the user via the industrial digital twin when the industrial machine is depicted in the video stream; provide, in response to the user request, a list of input devices indicating one or more input devices of the industrial machine that are depicted in a particular video image of the video stream, the list of input devices being presented in the industrial digital twin to the user; receive a user selection specifying a target input device in the list of input devices, the user selection being provided by the user via the industrial digital twin; generate, in response to the user selection of the target input device, one or more control commands specifying one or more operations to be performed by the on-premises robot to physically interact with the target input device of the industrial machine; and transmit the one or more control commands to the on-premises robot in the physical industrial facility.

To the accomplishment of the foregoing and related ends, certain illustrative aspects are described herein in connection with the following description and the accompanying drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 3 illustrates an example method for controlling an on-premises robot.

DETAILED DESCRIPTION

Figure 1:
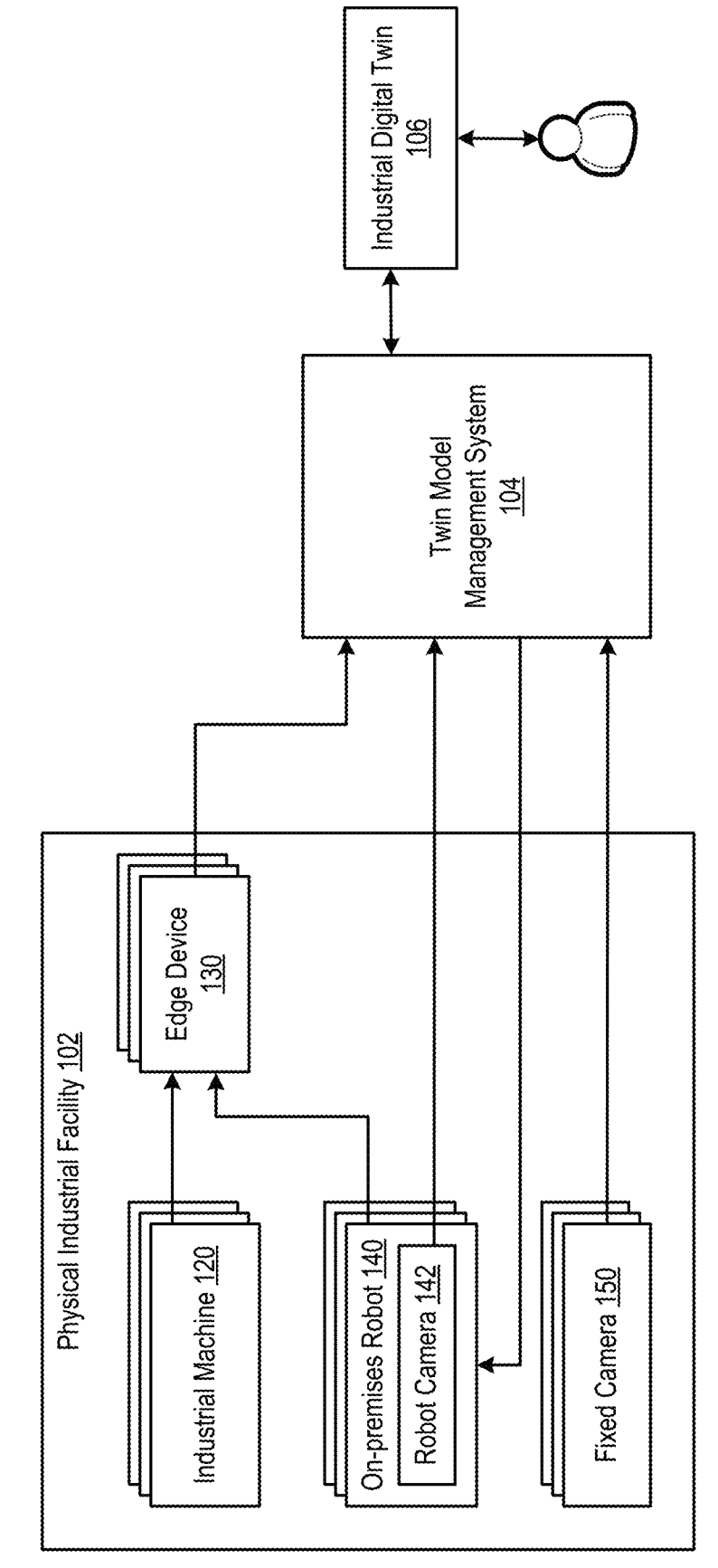
FIG. 1 illustrates an example system for controlling an on-premises robot.

The present disclosure is now described with reference to the drawings. In the following description, specific details may be set forth for purposes of explanation. It should be understood that the present disclosure may be implemented without these specific details.

As used herein, the terms "component," "system," "platform," "layer," "controller," "terminal," "station," "node," "interface" are intended to refer to a computer-related entity or an entity related to, or that is part of, an operational apparatus with one or more specific functionalities, wherein such entities may be hardware, a combination of hardware and software, software, or software in execution. For example, a component may be, but is not limited to being, a process running on a processor, a processor, a hard disk drive, multiple storage drives (of optical or magnetic storage medium) including affixed (e.g., screwed or bolted) or removable affixed solid-state storage drives, an object, an executable object, a thread of execution, a computer-executable program, and/or a computer. By way of illustration, both an application running on a server and the server may be a component. One or more components may reside within a process and/or thread of execution, and a component may be localized on one computer and/or distributed between two or more computers.

In addition, components as described herein may execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component may be an apparatus with specific functionality provided by mechanical parts operated by electric or electronic circuitry which is operated by a software or a firmware application executed by a processor, wherein the processor may be internal or external to the apparatus and may execute at least a part of the software or firmware application. As yet another example, a component may be an apparatus that provides specific functionality through electronic components without mechanical parts, the electronic components may include a processor therein to execute software or firmware that provides at least in part the functionality of the electronic components. As yet another example, interface(s) may include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" generally refer to the process of reasoning about or inferring states of the system, environment, and/or user from a set of observations as captured via events and/or data. For example, inference may be used to identify a specific context or action, or may generate a probability distribution over states. The inference may be probabilistic, e.g., the inference may be the computation of a probability distribution over states of interest based on a consideration of data and events. Inference may also refer to techniques employed for composing higher-level events from a set of events and/or data. Such inference may result in the construction of new events or actions from a set of observed events and/or stored event data, regardless of whether or not the events are correlated in close temporal proximity, and whether the events and data come from one or several event and data sources.

Moreover, the term "or" is intended to mean an inclusive "or" rather than an exclusive "or." In particular, unless clear from the context or specified otherwise, the phrase "X employs A or B" is intended to mean any of the natural inclusive permutations. Thus, the phrase "X employs A or B" is satisfied by any of the following instances: X employs A, X employs B, or X employs both A and B. In addition, the articles "a" and "an" as used in this present disclosure and the appended claims should generally be construed to mean "one or more" unless clear from the context or specified otherwise to be directed to a singular form.

Furthermore, the term "set" as used herein excludes the empty set, e.g., the set with no elements therein. Thus, a "set" in the present disclosure may include one or more elements or entities. For example, a set of controllers may include one or more controllers, a set of data resources may include one or more data resources, etc. Similarly, the term "group" as used herein refers to a collection of one or more entities. For example, a group of nodes refers to one or more nodes.

Various aspects or features will be presented in terms of systems that may include a number of devices, components, modules, and the like. It should be understood that various systems may include additional devices, components, modules, etc. and/or may not include all of the devices, components, modules, etc. that are discussed with reference to the figures. A combination of these approaches may also be used.

Systems and methods for controlling an on-premises robot through an industrial digital twin are described herein. For a physical industrial facility, an industrial digital twin that dynamically reflects the physical industrial facility in real-time or near real-time may be created. A user located at a remote location from the physical industrial facility may interact with the industrial digital twin to obtain various information about various industrial machines in the physical industrial facility. However, while interacting with the industrial digital twin of the physical industrial facility, the user may not be able to view a real scene of the physical industrial facility and may not be able to perform a physical action in the physical industrial facility. For example, the user may not be able to press a power button on an industrial machine to turn on the industrial machine in the physical industrial facility. As the user cannot view the real scene of the physical industrial facility, the user may not be aware of an actual situation in the physical industrial facility. In addition, as the user cannot cause a physical action to be performed in the physical industrial facility from the remote location, industrial operations in the physical industrial facility may be impacted, especially when human presence in the physical industrial facility is restricted for safety reasons (e.g., during a pandemic or during a natural disaster).

Systems and methods described herein may enable the user to view the real scene of the physical industrial facility while interacting with the industrial digital twin of the physical industrial facility. To enable the user to view the real scene of the physical industrial facility, the systems and methods may use one or more fixed cameras that are installed at predefined locations in the physical industrial facility and one or more on-premises robots that operate in the physical industrial facility. Each on-premises robot in the physical industrial facility may include one or more robot cameras that capture the environment around the on-premises robot in the physical industrial facility. In some embodiments, the user may provide one or more user requests via the industrial digital twin to request a camera view associated with a fixed camera in the physical industrial facility and/or request a camera view associated with an on-premises robot in the physical industrial facility. In response to the user requests, the systems and methods may receive from the fixed camera a video stream captured by the fixed camera and/or receive from the on-premises robot a video stream captured by the robot camera of the on-premises robot. The systems and methods may then present each video stream in a display element (e.g., a web browser window) in the industrial digital twin to the user. Accordingly, the user may view real-world images captured by the fixed camera and/or by the robot camera of the on-premises robot that are presented in the industrial digital twin to the user. Thus, the user may view the real scene of the physical industrial facility while interacting with the industrial digital twin of the physical industrial facility.

In addition, the systems and methods may also enable the user to control the on-premises robot to move to a target location in the physical industrial facility. To control the on-premises robot to move to the target location, the user may provide a user request specifying the target location, and the systems and methods may generate one or more control commands to automatically instruct the on-premises robot to move to the target location. Additionally or alternatively, the user may manually control the on-premises robot to move to the target location. For example, the user may provide one or more user requests in which each user request may specify one or more sequential movements for the on-premises robot to perform. The on-premises robot may sequentially perform these movements specified by the user, and thus the user may manually navigate the on-premises robot to the target location. When the on-premises robot arrives at the target location, the user may view the real-world images captured by the robot camera of the on-premises robot at the target location. Thus, by causing the on-premises robot to move to different locations in the physical industrial facility, the user may view the real-world images captured at the different locations in the physical industrial facility as needed.

The systems and methods described herein may facilitate the user in controlling the on-premises robot to perform a physical action in the physical industrial facility. For example, the systems and methods may facilitate the user in controlling the on-premises robot to physically interact with an industrial machine in the physical industrial facility. As an example, the systems and methods may receive a video stream captured by the on-premises robot in the physical industrial facility, and present the video stream in the industrial digital twin to the user. The systems and methods may receive a user request to select an input device of an industrial machine from the user via the industrial digital twin. For example, when the industrial machine is depicted in the video stream, the user may provide the user request to select an input device of the industrial machine. In response to the user request, the systems and methods may provide a list of input devices indicating one or more input devices (e.g., buttons, switches, etc.) of the industrial machine that are depicted in a particular video image of the video stream such as a video image that is captured most recently in the video stream. The systems and methods may then receive a user selection specifying a target input device in the list of input devices presented to the user. For example, the user may provide the user selection of the target input device via the industrial digital twin.

As described herein, in response to the user selection of the target input device, the systems and methods may generate one or more control commands specifying one or more operations to be performed by the on-premises robot to physically interact with the target input device of the industrial machine. For example, the control commands may specify one or more arm movements to be performed by the on-premises robot to reach the target input device and also specify an interaction operation (e.g., a pressing operation, a rotation operation, etc.) to be performed by a robot hand of the on-premises robot on the target input device when the robot hand of the on-premises robot is in physical contact with the target input device. The systems and methods may then transmit the control commands to the on-premises robot in the physical industrial facility. The on-premises robot may execute the control commands to reach the target input device of the industrial machine and press, rotate, actuate, disengage, or otherwise physically interact with the target input device of the industrial machine as requested by the user.

The systems and methods described herein may be advantageous in a number of technical respects. For example, as described herein, the systems and methods may enable the user to view the real scene of the physical industrial facility while interacting with the industrial digital twin of the physical industrial facility. Accordingly, the user may not only be presented with the information of various industrial machines in the physical industrial facility that is provided by the industrial digital twin, but also be presented with the real-world images that are captured in the physical industrial facility by the fixed cameras and/or by the robot cameras of the on-premises robots. Thus, the user may be provided with comprehensive information about the physical industrial facility, even if the user is located remotely from the physical industrial facility. In addition, the systems and methods may enable the user to control the on-premises robot to move to a target location in the physical industrial facility. Accordingly, the user may control the on-premises robot to move to the target location, and view the real-world images captured at the target location when needed.

As described herein, the systems and methods may facilitate the user in controlling the on-premises robot to perform a physical action on an industrial machine in the physical industrial facility. For example, when the user sees the industrial machine depicted in the video stream captured by the on-premises robot, the user may provide via the industrial digital twin a user request to select an input device of the industrial machine. In response to the user request, the systems and methods may obtain a particular video image in the video stream that is captured by the on-premises robot most recently, and perform an image processing operation on the particular video image using a machine learning model. The machine learning model may detect one or more input devices of the industrial machine that are depicted in the particular video image, and the systems and methods may present the list of input devices that indicates these input devices of the industrial machine to the user. As described herein, the user may provide a user selection specifying a target input device in the list of input devices. In response to the user selection of the target input device, the systems and methods may determine one or more operations (e.g., one or more arm movements, an interaction operation, etc.) to be performed by the on-premises robot to reach the target input device and perform a corresponding action on the target input device. The systems and methods may generate one or more control commands specifying these operations, and provide the control commands to the on-premises robot in the physical industrial facility.

Thus, by providing the list of input devices indicating the input devices of the industrial machine to the user, the systems and methods may facilitate the user in selecting the target input device among one or more input devices of the industrial machine that are depicted in the particular video image. In addition, after the user selects the target input device of the industrial machine, the systems and methods may determine the operations to be performed by the on-premises robot to physically interact with the target input device, and instruct the on-premises robot to perform these operations. Accordingly, the systems and methods may eliminate the need for the user to manually control the robot arm and the robot hand of the on-premises robot to reach the target input device and perform the corresponding action on the target input device. As a result, the user input provided by the user for controlling the on-premises robot to physically interact with the target input device may be significantly simplified, the accuracy of the on-premises robot in interacting with the target input device may be improved, and therefore user experience of the user may also be improved.

As described herein, the systems and methods may not detect a particular input device of the industrial machine in the particular video image when the systems and methods perform the image processing operation on the particular video image using the machine learning model. In this case, the user may manually control the on-premises robot to physically interact with the particular input device. For example, the user may provide one or more user requests in which each user request may specify one or more operations (e.g., arm movements, an interaction operation, etc.) to be performed by the on-premises robot to interact with the particular input device. The on-premises robot may perform these operations specified by the user, and thus the user may manually control the on-premises robot to reach the particular input device and perform a corresponding action on the particular input device. As the on-premises robot performs these operations to interact with the particular input device, the robot hand of the on-premises robot may be moved to a position proximate to the particular input device. As described herein, the systems and methods may identify a reference image that depicts the robot hand of the on-premises robot being proximate to the particular input device, and determine an input device appearance of the particular input device in the reference image. Thus, the systems and methods may determine the input device appearance of the particular input device that the user manually controls the on-premises robot to interact with. The systems and methods may then identify one or more video images in the video stream that depict the particular input device based on the input device appearance, and use these video images as training data to train the machine learning model in detecting a similar input device in images. Thus, after the machine learning model is trained with a large amount of training data including these video images, the machine learning model may be capable of detecting in a video image a similar input device that belongs to the same input device category as the particular input device, thereby facilitating the user in selecting the similar input device among one or more input devices of an industrial machine that are depicted in the video image.

As described herein, the systems and methods may also identify the interaction operation (e.g., the press-and-rotate operation) that the user manually controls the on-premises robot to perform on the particular input device when the robotic hand of the on-premises robot is in physical contact with the particular input device. The systems and methods may store this interaction operation in association with the input device category of the particular input device as an interaction operation to be performed on an input device that belongs to the input device category. Thus, after training the machine learning model to detect a similar input device that belongs to the input device category and identifying the interaction operation to be performed on the similar input device that belongs to the input device category, the systems and methods may not only be able to facilitate the user in selecting the similar input device among one or more input devices of an industrial machine that are depicted in a video image, but also be able to determine the operations to be performed by the on-premises robot to physically interact with the similar input device. As a result, the user may no longer need to manually control the on-premises robot to interact with the similar input device that belongs to the input device category at a future time. Instead, the user may simply select the similar input device in the list of input devices presented to the user. The systems and methods may then determine the operations to be performed by the on-premises robot to physically interact with the similar input device, and instruct the on-premises robot to perform these operations.

As described herein, the systems and methods may enable the user to address an unexpected event that the on-premises robot experiences in the physical industrial facility. For example, when the on-premises robot experiences an unexpected event (e.g., the on-premises robot encounters an obstacle that prevents the on-premises robot to proceed along a moving path provided by the systems and methods), the systems and methods may receive an assistance request from the on-premises robot, and present a robot assistance alert in the industrial digital twin to the user. In response to the robot assistance alert, the user may manually control the on-premises robot to address the unexpected event in the physical industrial facility. For example, the user may provide one or more user requests in which each user request may specify one or more operations (e.g., sequential movements to navigate around the obstacle, arm movements and interaction operations to reach and relocate the obstacle, etc.) to be performed by the on-premises robot to address the unexpected event. The on-premises robot may perform these operations specified by the user, and thus the user may manually control the on-premises robot to address the unexpected event. This implementation is advantageous, because it enables the user located remotely from the physical industrial facility to control the on-premises robot and address the unexpected event that the on-premises robot experiences in the physical industrial facility. As a result, the on-premises robot may operate in the physical industrial facility in an effective manner and may be used to facilitate the industrial operations in the physical industrial facility, especially when human presence in the physical industrial facility is restricted for safety reasons (e.g., during a pandemic or during a natural disaster).

Various illustrative embodiments will now be described in detail with reference to the figures. It should be understood that the illustrative embodiments described below are provided as examples and that other examples not explicitly described herein may also be captured by the scope of the claims set forth below. The systems and methods described herein may provide any of the benefits mentioned above, as well as various additional and/or alternative benefits that will be described and/or made apparent below.

FIG. 1 illustrates an example system 100 for controlling an on-premises robot in a physical industrial facility. As depicted in FIG. 1, the system 100 may include a physical industrial facility 102, a twin model management system (TMMS) 104, and an industrial digital twin 106.

In some embodiments, the physical industrial facility 102 may be a physical environment in which one or more industrial operations are performed. As depicted in FIG. 1, the physical industrial facility 102 may include one or more industrial machines 120, one or more edge devices 130, one or more on-premises robots 140, and one or more fixed cameras 150. Other devices and systems in the physical industrial facility 102 are also possible and contemplated.

In some embodiments, an industrial machine 120 may perform various operations and/or functionalities in the physical industrial facility 102. For example, the industrial machine 120 may be included in one or more industrial automation systems that carry out one or more industrial processes. Non-limiting examples of the industrial machine 120 include, but are not limited to, an industrial controller (e.g., programmable automation controller such as programmable logic controller (PLC), etc.), a field device (e.g., a sensor, a meter, an Internet of Things (IoT) device, etc.), a motion control device (e.g., a motor drive, etc.), an operator interface device (e.g., a human-machine interface device, an industrial monitor, a graphic terminal, a message display device, etc.), an industrial automated machine (e.g., an industrial robot, etc.), a lot control system (e.g., a barcode marker, a barcode reader, etc.), a vision system device (e.g., a vision camera, etc.), a safety relay, an optical safety system, and/or other types of industrial machines. In some embodiments, the industrial machine 120 may include one or more input devices (e.g., a push button, an emergency button, a rotary switch, a toggle switch, etc.) that can be used to start, stop, and/or adjust one or more operations of the industrial machine 120. The industrial machine 120 may also be referred to herein as the industrial device 120.

In some embodiments, the industrial machine 120 may transmit data associated with the industrial machine 120 to the edge device 130 and/or to the TMMS 104 at a predefined interval (e.g., every 1 s). Additionally or alternatively, as the data associated with the industrial machine 120 is generated or determined, the industrial machine 120 may transmit the data associated with the industrial machine 120 to the edge device 130 and/or to the TMMS 104 in real-time or near real-time. In some embodiments, the data associated with the industrial machine 120 may include, but is not limited to, an operation status of the industrial machine 120, an operation metric of the industrial machine 120, a device configuration of the industrial machine 120, sensor data generated by a sensor of the industrial machine 120, a current state of an input device on the industrial machine 120, a value of a process variable associated with an industrial process in which the industrial machine 120 participates, etc. Other types of data associated with the industrial machine 120 are also possible and contemplated.

In some embodiments, the edge device 130 may collect data from the industrial machines 120, the on-premises robots 140, and/or other data sources (e.g., a local data store, an on-premises processing system, etc.) and transmit the data to the TMMS 104 for industrial digital twin update, data processing, and/or data storage. For example, the edge devices 130 may collect the data from the industrial machines 120, the on-premises robots 140, and/or other data sources at a predefined interval (e.g., every 1 s) and transmit the collected data to the TMMS 104. In some embodiments, the industrial machines 120, the on-premises robots 140, and/or other data sources may transmit their data to the edge device 130 in real-time or near real-time, and the edge device 130 may transmit the data to the TMMS 104 in real-time or near real-time or at a predefined interval (e.g., every 1 s). In some embodiments, the edge device 130 may be located within the physical industrial facility 102 as a gateway device that facilitates data communication from the industrial machines 120 and the on-premises robots 140 in the physical industrial facility 102 to the TMMS 104 and vice versa. In some embodiments, the industrial machines

120 and the on-premises robots 140 may transmit their data directly to the TMMS 104 without transmitting their data to the edge device 130.

In some embodiments, the on-premises robot 140 may be a robotic device or a robotic machine that operates in the physical industrial facility 102. As depicted in FIG. 1, the on-premises robot 140 may include a robot camera 142 that captures the surrounding environment of the on-premises robot 140 in the physical industrial facility 102. For example, the robot camera 142 may capture a video stream that includes a sequence of video images, each video image may be a real-world image that depicts the actual environment around the on-premises robot 140 in the physical industrial facility 102. The video stream and the video images captured by the robot camera 142 may be referred to as the video stream and the video images captured by the on-premises robot 140 that includes the robot camera 142. In some embodiments, the on-premises robot 140 may transmit the video stream captured by the robot camera 142 to the TMMS 104.

In some embodiments, the on-premises robot 140 may include a moving system that enables the on-premises robot 140 to move from one location to another location. The on-premises robot 140 may also include a robotic arm and a robotic hand. The robotic hand may be positioned at a distal end of the robotic arm and may include a touch sensor. In some embodiments, the on-premises robot 140 may operate its robotic arm and/or its robotic hand to perform various operations such as interacting with an input device on an industrial machine 120, picking up an object, relocating an obstacle, etc. Other components of the on-premises robot 140 are also possible and contemplated.

In some embodiments, the on-premises robot 140 may be controlled by the user via the industrial digital twin 106 and the TMMS 104. The on-premises robot 140 may be controlled by the user in a manual control mode or in an automated control mode. In some embodiments, when the on-premises robot 140 operates in the manual control mode, the user may manually control the on-premises robot 140 to perform a physical task (e.g., moving to a target location, pushing a button on an industrial machine 120, etc.). For example, to control the on-premises robot 140 to perform the physical task under the manual control mode, the user may provide one or more user requests via the industrial digital twin 106, each user request may specify one or more operations (e.g., the sequential movements to move to the target location, the arm movements, the interaction operation, etc.) to be performed by the on-premises robot 140 to carry out the physical task. In response to the user requests provided by the user via the industrial digital twin 106, the TMMS 104 may generate one or more control commands instructing the on-premises robot 140 to perform the operations specified by the user in the user requests, and transmit the control command to the on-premises robot 140. As the on-premises robot 140 executes the control commands, the on-premises robot 140 may perform the operations specified by the user, and thus the user may manually control the on-premises robot 140 to carry out the physical task. Thus, in this case, the TMMS 104 may not determine the operations to be performed by the on-premises robot 140 to carry out the physical task. Instead, the user may specify the operations to be performed by the on-premises robot 140 to carry out the physical task in the user requests, and the TMMS 104 may instruct the on-premises robot 140 to perform the operations specified by the user.

On the other hand, when the on-premises robot 140 operates in the automated control mode, the TMMS 104 may automatically determine the operations to be performed by the on-premises robot 140 to carry out the physical task based on a user request provided by the user. For example, to control the on-premises robot 140 to perform the physical task under the automated control mode, the user may provide a user request via the industrial digital twin 106, the user request may specify an aspect (e.g., a target aspect) of the physical task without specifying the operations to be performed by the on-premises robot 140 to carry out the physical task. For example, the physical task may be moving to a target location. In this case, the user request provided by the user may specify the target location but may not specify the sequential movements to be performed by the on-premises robot 140 to arrive at the target location. As another example, the physical task may be interacting with a target input device. In this case, the user request provided by the user may specify the target input device but may not specify the arm movements and the interaction operation to be performed by the on-premises robot 140 to reach the target input device and interact with the target input device.

In some embodiments, in response to the user request specifying the aspect of the physical task that is provided by the user via the industrial digital twin 106, the TMMS 104 may determine one or more operations (e.g., the sequential movements to move to the target location, the arm movements, the interaction operation, etc.) to be performed by the on-premises robot 140 to carry out the physical task based on the aspect of the physical task specified in the user request. The TMMS 104 may then generate one or more control commands instructing the on-premises robot 140 to perform the determined operations, and transmit the control command to the on-premises robot 140. Thus, in this case, the user may specify only the aspect of the physical task (e.g., the target location, the target input device) in the user request. Based on the aspect of the physical task specified in the user request, the TMMS 104 may determine the operations to be performed by the on-premises robot 140 to carry out the physical task and instruct the on-premises robot 140 to perform these operations. Accordingly, the TMMS 104 may automatically control the on-premises robot 140 to carry out the physical task given the aspect of the physical task specified by the user. In some embodiments, the on-premises robot 140 may operate under the automated control mode by default, and the user may provide a user request to activate or deactivate the manual control mode for the on-premises robot 140 as needed.

In some embodiments, similar to the industrial machine 120, the on-premises robot 140 may transmit data associated with the on-premises robot 140 to the edge device 130 and/or to the TMMS 104 at a predefined interval (e.g., every 1 s). Additionally or alternatively, as the data associated with the on-premises robot 140 is generated or determined, the on-premises robot 140 may transmit the data associated with the on-premises robot 140 to the edge device 130 and/or to the TMMS 104 in real-time or near real-time. In some embodiments, the data associated with the on-premises robot 140 may include, but is not limited to, a current location of the on-premises robot 140, a current orientation of the on-premises robot 140, a battery level of the on-premises robot 140, an arm position of the on-premises robot 140 that indicates a position of the robotic arm of the on-premises robot 140, a camera position of the on-premises robot 140 that indicates a position of the robot camera 142 of the on-premises robot 140, etc. Other types of data associated with the on-premises robot 140 are also possible and contemplated. In some embodiments, the data associated with the on-premises robot 140 may be presented in the industrial digital twin 106 to the user, thereby facilitating the user in controlling the on-premises robot 140. When the on-premises robot 140 operates in the automated control mode, the data associated with the on-premises robot 140 may also be used by the TMMS 104 in determining the operations (e.g., the sequential movements to move to the target location, the arm movements, the interaction operation, etc.) to be performed by the on-premises robot 140 to carry out the physical task given the aspect of the physical task specified by the user in the user request as described herein.

In some embodiments, the fixed camera 150 may be installed at a predefined location in the physical industrial facility 102 and may capture the surrounding environment of the fixed camera 150 in the physical industrial facility 102. For example, the fixed camera 150 may capture a video stream that includes a sequence of video images, each video image may be a real-world image that depicts the actual environment within the field of view of the fixed camera 150 in the physical industrial facility 102. In some embodiments, the fixed camera 150 may transmit the video stream captured by the fixed camera 150 to the TMMS 104.

In some embodiments, the TMMS 104 may be a computing system that generate and manage the industrial digital twin 106 of the physical industrial facility 102. The industrial digital twin 106 may be a virtual model of the physical industrial facility 102 that dynamically reflects the physical industrial facility 102 in real-time or near real-time. For example, the industrial digital twin 106 may include virtual representations of various physical assets (e.g., the industrial machines 120, the on-premises robots 140, etc.) in the physical industrial facility 102. For each physical asset, the TMMS 104 may frequently receive data associated with the physical asset in real-time or near real-time from the physical asset and/or from the edge device 130 in the physical industrial facility 102, and update the industrial digital twin 106 using this data to dynamically reflect the operations, the working conditions, and/or other aspects of the physical asset. Accordingly, the industrial digital twin 106 may be the dynamic virtual model of the physical industrial facility 102 in which the information associated with the virtual representation of the physical asset in the industrial digital twin 106 may accurately indicate the behaviors and the operation status of the actual physical asset in the physical industrial facility 102 in real-time or near real-time. In some embodiments, when receiving the data associated with the physical asset from the physical asset and/or from the edge device 130, the TMMS 104 may store the data associated with the physical asset as part of digital twin data associated with the industrial digital twin 106.

In some embodiments, the industrial digital twin 106 of the physical industrial facility 102 may be presented to the user in the form of a virtual environment. For example, the TMMS 104 may present the industrial digital twin 106 in the form of the virtual environment to the user on a user device (e.g., a personal computer, a laptop device, a tablet device, a mobile phone, a wearable headset device, etc.). In some embodiments, the TMMS 104 may also present one or more user interfaces in the industrial digital twin 106 to the user. Each user interface may include one or more user interface (UI) elements being overlaid on the virtual environment that reflects the physical industrial facility 102, and the user may use these UI elements to interact with the industrial digital twin 106. For example, the TMMS 104 may provide various information to the user in one or more UI elements (e.g., a web browser window, a pop-up window, etc.) presented in the industrial digital twin 106. As another example, the user may interact with an UI element (e.g., a list of input devices, etc.) presented in the industrial digital twin 106 to provide a user request and/or a user input via the industrial digital twin 106. In some embodiments, the user may interact with the industrial digital twin 106 using one or more input/ output (IO) devices (e.g., a mouse, a keyboard, a microphone, a control handle, etc.). In some embodiments, when the user provides a user request and/or a user input via the industrial digital twin 106, the TMMS 104 may receive the user request and/or the user input provided by the user via the industrial digital twin 106.

Figure 2:
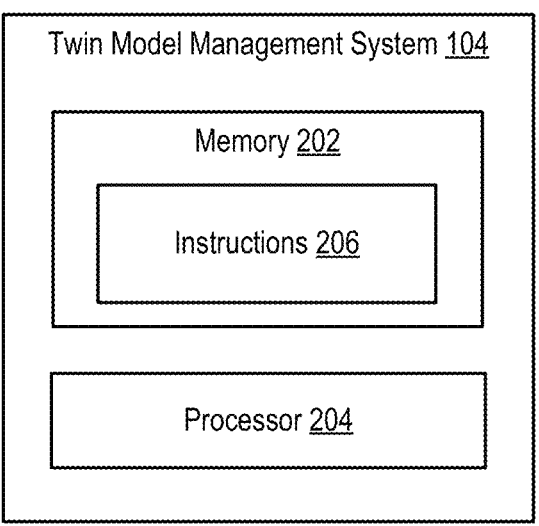
FIG. 2 illustrates an example twin model management system.

FIG. 2 illustrates an example TMMS 104 for managing an industrial digital twin of a physical industrial facility and facilitating a user in controlling an on-premises robot in the physical industrial facility via the industrial digital twin. For example, the TMMS 104 may manage the industrial digital twin 106 of the physical industrial facility 102 and may facilitate the user in controlling the on-premises robot 140 in the physical industrial facility 102 via the industrial digital twin 106. In some embodiments, the TMMS 104 may be implemented by computing resources such as servers, processors, memory devices, storage devices, communication interfaces, and/or other computing resources. In some embodiments, the TMMS 104 may be implemented on a computing device (e.g., a local server) located in the physical industrial facility 102. Additionally or alternatively, the TMMS 104 may be implemented on a cloud platform. In some embodiments, various components of the system 100 may collaborate with one another to perform one or more operations of the TMMS 104 described herein. For example, one or more robot control operations of the TMMS 104 described herein may be performed by the on-premises robot 140. Additionally or alternatively, the on-premises robot 140 and the TMMS 104 may collaborate with one another to perform one or more robot control operations of the TMMS 104.

As depicted in FIG. 2, the TMMS 104 may include, without limitation, a memory 202 and a processor 204 communicatively coupled to one another. The memory 202 and the processor 204 may each include or be implemented by computer hardware that is configured to store and/or execute computer software. Other components of computer hardware and/or software not explicitly shown in FIG. 2 may also be included within the TMMS 104. In some embodiments, the memory 202 and the processor 204 may be distributed between multiple devices and/or multiple locations as may serve a particular implementation.

The memory 202 may store and/or otherwise maintain executable data used by the processor 204 to perform one or more functionalities of the TMMS 104 described herein. For example, the memory 202 may store instructions 206 that may be executed by the processor 204. In some embodiments, the memory 202 may be implemented by one or more memory or storage devices, including any memory or storage devices described herein, that are configured to store data in a transitory or non-transitory manner. In some embodiments, the instructions 206 may be executed by the processor 204 to cause the TMMS 104 to perform one or more functionalities described herein. The instructions 206 may be implemented by any suitable application, software, code, and/or other executable data instance. Additionally, the memory 202 may also maintain any other data accessed, managed, used, and/or transmitted by the processor 204 in a particular implementation.

The processor 204 may be implemented by one or more computer processing devices, including general purpose processors (e.g., central processing units (CPUs), graphics processing units (GPUs), microprocessors, etc.), special purpose processors (e.g., application specific integrated circuits (ASICs), field-programmable gate arrays (FPGAs), etc.), or the like. The TMMS 104 may use the processor 204 (e.g., when the processor 204 is directed to perform operations represented by instructions 206 stored in the memory 202) and perform various functionalities associated with robot control and digital twin management in any manner described herein or as may serve a particular implementation.

In some embodiments, the TMMS 104 may create and manage the industrial digital twin 106 of the physical industrial facility 102, and the user may interact with the industrial digital twin 106 of the physical industrial facility 102 as described herein. For example, the user may access the industrial digital twin 106 of the physical industrial facility 102 on the user device to obtain information on operations of an industrial machine 120 in the physical industrial facility 102. In some embodiments, the TMMS 104 may enable the user to view the real-world images captured in the physical industrial facility 102 while interacting with the industrial digital twin 106 of the physical industrial facility 102. As described herein, the physical industrial facility 102 may include one or more fixed cameras 150, each fixed camera 150 may be installed at a predefined location in the physical industrial facility 102 and may capture the surrounding environment within the field of view of the fixed camera 150 in the physical industrial facility 102. The physical industrial facility 102 may also include one or more on-premises robot 140 that operate in the physical industrial facility 102, each on-premises robot 140 may include the robot camera 142 that captures the surrounding environment of the on-premises robot 140 in the physical industrial facility 102.

In some embodiments, to view the real-world images captured in the physical industrial facility 102, the user may provide one or more user requests via the industrial digital twin 106 to request one or more camera views in the physical industrial facility 102. For example, the user may provide a user request requesting a camera view associated with a fixed camera 150 in the physical industrial facility 102. In response to this user request, the TMMS 104 may receive from the fixed camera 150 a video stream captured by the fixed camera 150. Additionally or alternatively, the user may provide a user request requesting a camera view associated with an on-premises robot 140 in the physical industrial facility 102. In response to this user request, the TMMS 104 may receive from the on-premises robot 140 a video stream captured by the robot camera 142 of the on-premises robot 140. The TMMS 104 may then present each video stream in a display element (e.g., a web browser window) in the industrial digital twin 106 to the user. Accordingly, the user may view the real-world images captured by the fixed camera 150 and/or the real-world images captured by the on-premises robot 140 in the physical industrial facility 102 that are presented in the industrial digital twin 106 of the physical industrial facility 102 to the user. Thus, the user may view the real scenes in the physical industrial facility 102 while interacting with the virtual environment that reflects or replicates the physical industrial facility 102.

Figure 4:
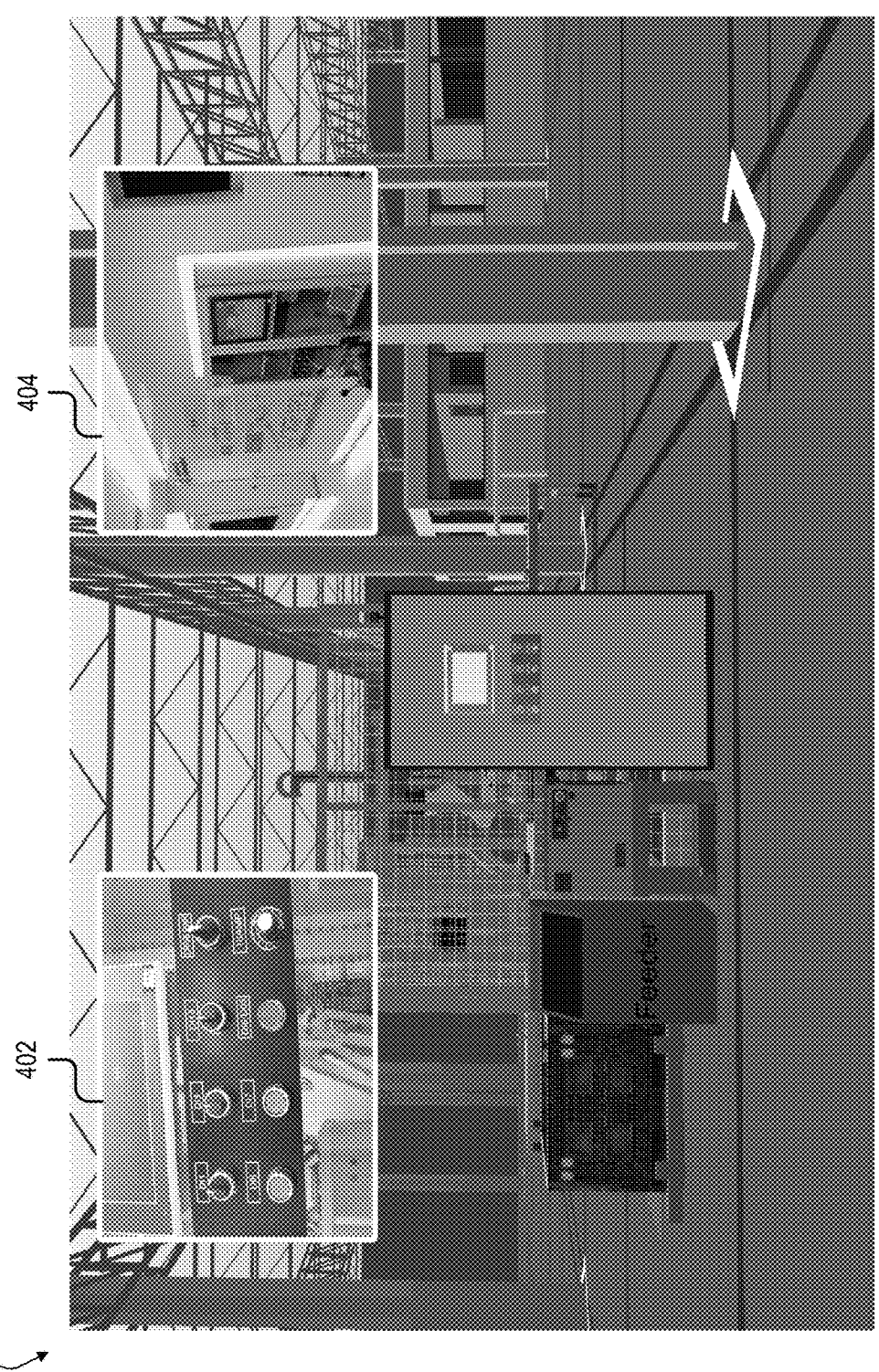
FIG. 4 and FIGS. 5A-5C illustrate example interfaces presented in an industrial digital twin to a user.

As an example, FIG. 4 illustrates an interface 400 presented in the industrial digital twin 106 to the user. As depicted in FIG. 4, the interface 400 may include a camera view 402 and a camera view 404. The camera view 402 may include a first video stream captured by the on-premises robot 140 that is displayed in a first web browser window.

The camera view 404 may include a second video stream captured by the fixed camera 150 that is displayed in a second web browser window. As depicted in FIG. 4, the first web browser window in which the camera view 402 is displayed and the second web browser window in which the camera view 404 is displayed may be overlaid on the industrial digital twin 106 being presented to the user in the form of the virtual environment. Accordingly, the user may interact with the virtual environment and also view the real-world images capturing the physical environment at different locations in the physical industrial facility 102. As a result, the user may be informed of an actual situation in the physical industrial facility 102 that may not be indicated in the information provided by the industrial digital twin 106.

As described herein, the fixed camera 150 may be installed at the predefined location in the physical industrial facility 102 while the on-premises robot 140 may move to different locations in the physical industrial facility 102. Accordingly, the user may control the on-premises robot 140 to move to a target location in the physical industrial facility 102 in order to view the real-world images captured at the target location. In some embodiments, the user may control the on-premises robot 140 to move to the target location with the on-premises robot 140 being operated in the automated control mode. To control the on-premises robot 140 to move to the target location under the automated control mode, the user may provide a user request via the industrial digital twin 106, the user request may specify the target location (e.g., the workstation S3, the loading dock D5, etc.) in the physical industrial facility 102. In some embodiments, in response to the user request, the TMMS 104 may reference the digital twin data of the industrial digital twin 106 to obtain the current location of the on-premises robot 140 in the physical industrial facility 102, and determine a moving path from the current location of the on-premises robot 140 to the target location based on a facility map of the physical industrial facility 102. The TMMS 104 may then generate a control command instructing the on-premises robot 140 to follow the moving path, and transmit the control command to the on-premises robot 140. In some embodiments, in response to receiving the control command from the TMMS 104, the on-premises robot 140 may execute the control command to follow the moving path and move to the target location. In some embodiments, when the on-premises robot 140 reaches the target location at the end point of the moving path, the on-premises robot 140 may provide an arrival notification to the TMMS 104, and the TMMS 104 may present in the industrial digital twin 106 a notification to the user indicating that the on-premises robot 140 has arrived at the target location.

In some embodiments, while following the moving path to move to the target location, the on-premises robot 140 may detect an obstacle that prevents the on-premises robot 140 from proceeding along the moving path. For example, the on-premises robot 140 may include a detection sensor, and the sensor output of the detection sensor may indicate that the on-premises robot 140 encounters the obstacle. Additionally or alternatively, the on-premises robot 140 may analyze the video images captured by its robot camera 142, and determine that one or more video images captured by the robot camera 142 depict an obstacle. Accordingly, the on-premises robot 140 may determine that the on-premises robot 140 encounters the obstacle. In some embodiments, when the on-premises robot 140 encounters the obstacle, the on-premises robot 140 may transmit a corresponding notification to the TMMS 104. In response to this notification, the TMMS 104 may reference the digital twin data of the industrial digital twin 106 to obtain the current location of the on-premises robot 140 at which the obstacle is encountered, and determine a different moving path from the current location of the on-premises robot 140 to the target location based on the facility map of the physical industrial facility 102. The TMMS 104 may then generate a control command instructing the on-premises robot 140 to follow the different moving path instead of following the moving path, and transmit the control command to the on-premises robot 140. In some embodiments, in response to receiving the control command from the TMMS 104, the on-premises robot 140 may execute the control command to follow the different moving path and move to the target location.

Alternatively, the user may control the on-premises robot 140 to move to the target location with the on-premises robot 140 being operated in the manual control mode. To manually control the on-premises robot 140 to move to the target location under the manual control mode, the user may provide one or more user requests via the industrial digital twin 106, each user request may specify one or more movements (e.g., move forward 5 m, make a left turn, etc.) to be sequentially performed by the on-premises robot 140 to move to the target location. In some embodiments, for each user request provided by the user, the TMMS 104 may generate a control command instructing the on-premises robot 140 to perform the movements that are indicated in the user request, and transmit the control command to the on-premises robot 140. In some embodiments, in response to receiving the control command from the TMMS 104, the on-premises robot 140 may execute the control command and perform the movements specified by the user, and thus the user may manually navigate the on-premises robot 140 towards the target location.

In some embodiments, when the on-premises robot 140 arrives at the target location, the robot camera 142 of the on-premises robot 140 may capture the environment at the target location in its video stream. Accordingly, the user may view the real-world images that depict the target location in the video stream presented to the user in the industrial digital twin 106. Thus, by controlling the on-premises robot 140 to move to the target location, the user may view the real-world images captured at the target location while the user interacts with the industrial digital twin 106 of the physical industrial facility 102.

In some embodiments, in addition to enabling the user to view the real-world images captured in the physical industrial facility 102 while interacting with the industrial digital twin 106 of the physical industrial facility 102, the TMMS 104 may facilitate the user in controlling the on-premises robot 140 to perform a physical action in the physical industrial facility 102. For example, the TMMS 104 may facilitate the user in controlling the on-premises robot 140 to physically interact with an industrial machine 120 in the physical industrial facility 102. To illustrate, FIG. 3 provides an example method 300 for controlling an on-premises robot in a physical industrial facility. While FIG. 3 shows illustrative operations according to one embodiment, other embodiments may omit, add to, reorder, and/or modify any of the operations shown in FIG. 3. In some examples, multiple operations shown in FIG. 3 or described in relation to FIG. 3 may be performed concurrently (e.g., in parallel) with one another, rather than being performed sequentially as illustrated and/or described. One or more of the operations shown in FIG. 3 may be performed by a twin model management system such as the TMMS 104 and/or any implementation thereof.

At operation 302, the TMMS 104 may present a video stream captured by an on-premises robot 140 in the physical industrial facility 102 to the user. For example, the TMMS 104 may receive the video stream captured by the on-premises robot 140 in the physical industrial facility 102, and present the video stream in the industrial digital twin 106 of the physical industrial facility 102 to the user.

At operation 304, the TMMS 104 may receive a user request to select an input device of an industrial machine 120 from the user via the industrial digital twin 106. For example, the industrial machine 120 may be depicted in the video stream presented to the user in the industrial digital twin 106. The user may see the industrial machine 120 in the video stream and provide via the industrial digital twin 106 the user request to select an input device of the industrial machine 120.

At operation 306, in response to the user request, the TMMS 104 may provide a list of input devices in the industrial digital twin 106 to the user. The list of input devices may indicate one or more input devices (e.g., buttons, switches, etc.) of the industrial machine 120 that are depicted in a particular video image of the video stream. The particular video image of the video stream may be a video image that is captured by the on-premises robot 140 most recently and may depict the input devices of the industrial machine 120. In some embodiments, the TMMS 104 may perform an image processing operation on the particular video image to detect the input devices of the industrial machine 120 that are depicted in the particular video image. The TMMS 104 may then generate the list of input devices indicating the input devices of the industrial machine 120 detected in the particular video image, and present the list of input devices in the industrial digital twin 106 to the user.

At operation 308, the TMMS 104 may receive a user selection specifying a target input device in the list of input devices. The user selection of the target input device may be provided by the user via the industrial digital twin 106 and may specify the target input device that the on-premises robot 140 needs to physically interact with as requested by the user.

At operation 310, in response to the user selection of the target input device, the TMMS 104 may generate one or more control commands specifying one or more operations to be performed by the on-premises robot 140 to physically interact with the target input device of the industrial machine 120. For example, the TMMS 104 may determine the one or more operations (e.g., one or more arm movements, an interaction operation, etc.) to be performed by the on-premises robot 140 to reach the target input device and manipulate the target input device. The TMMS 104 may then generate the one or more control commands instructing the on-premises robot 140 to perform these operations.

At operation 312, the TMMS 104 may transmit the one or more control commands to the on-premises robot 140 in the physical industrial facility 102. In some embodiments, when receiving the control commands from the TMMS 104, the on-premises robot 140 may execute the control commands and perform the operations specified in the control commands to physically interact with the target input device of the industrial machine 120 as requested by the user.

Thus, as described above, the user may control the on-premises robot 140 via the industrial digital twin 106 of the physical industrial facility 102, and the TMMS 104 may cause the on-premises robot 140 to physically interact with the industrial machine 120 in the physical industrial facility 102 accordingly. In some embodiments, to control the on-premises robot 140 to physically interact with the industrial machine 120, the user may first control the on-premises robot 140 to move to a target location where the industrial machine 120 is located. For example, the user may control the on-premises robot 140 to move to the target location under the automated control mode or under the manual control mode as described herein. In some embodiments, when the on-premises robot 140 arrives at the target location, the on-premises robot 140 may provide an arrival notification to the TMMS 104, and the TMMS 104 may present in the industrial digital twin 106 a notification to the user indicating that the on-premises robot 140 has arrived at the target location (e.g., the workstation S3).

In some embodiments, when the on-premises robot 140 is at the target location, the user may provide via the industrial digital twin 106 a user request to select an industrial machine 120 with which the on-premises robot 140 needs to interact. In response to the user request, the TMMS 104 may reference a facility layout of the physical industrial facility 102, and identify one or more industrial machines 120 located at the target location. Additionally or alternatively, the TMMS 104 may perform one or more image processing operations on one or more video images captured by the on-premises robot 140 at the target location, and identify the industrial machines 120 located at the target location that are depicted in the video images. The TMMS 104 may then generate a list of industrial machines indicating the industrial machines 120 located at the target location, and present the list of industrial machines in the industrial digital twin 106 to the user.

In some embodiments, the user may provide a user selection specifying an industrial machine 120 in the list of industrial machines presented to the user. The user selection of the industrial machine 120 may be provided by the user via the industrial digital twin 106 and may specify the industrial machine 120 that the on-premises robot 140 needs to interact with as requested by the user.

In some embodiments, in response to the user selection of the industrial machine 120, the TMMS 104 may determine the current location of the on-premises robot 140 as indicated in the digital twin data of the industrial digital twin 106, determine a machine location of the industrial machine 120 as indicated in the facility layout of the physical industrial facility 102, and determine a moving path from the current location of the on-premises robot 140 to the machine location of the industrial machine 120. The TMMS 104 may then generate a control command instructing the on-premises robot 140 to follow the moving path to a position proximate to the industrial machine 120, and transmit the control command to the on-premises robot 140. In some embodiments, in response to receiving the control command from the TMMS 104, the on-premises robot 140 may execute the control command to follow the moving path and move towards the industrial machine 120. In some embodiments, as the on-premises robot 140 proceeds along the moving path, the on-premises robot 140 may frequently determine a distance between the on-premises robot 140 and the industrial machine 120 at the end point of the moving path using its distance sensor. When the distance between the on-premises robot 140 and the industrial machine 120 satisfies a predefined distance threshold (e.g., less than 30 cm), the on-premises robot 140 may determine that the on-premises robot 140 is at the position proximate to the industrial machine 120, and therefore the on-premises robot 140 may stop moving along the moving path. The on-premises robot 140 may then transmit an arrival notification to the TMMS 104, and the TMMS 104 may present in the industrial digital twin 106 a notification to the user indicating that the on-premises robot 140 is now located proximate to the industrial machine 120 selected by the user.

It should be understood that the implementation for controlling the on-premises robot 140 to move to the position proximate to the industrial machine 120 selected by the user as described above is merely an example. Alternatively, the TMMS 104 may provide a machine identifier of the industrial machine 120 selected by the user to the on-premises robot 140, and instruct the on-premises robot 140 to move to a position proximate to the industrial machine 120 that has the machine identifier. In response to receiving the machine identifier of the industrial machine 120 from the TMMS 104, the on-premises robot 140 may scan machine-readable symbols (e.g., a Quick Response (QR) code, a barcode, etc.) on various industrial machines 120 at the target location using its reader device (e.g., a QR code reader, a barcode reader, etc.) until the on-premises robot 140 identifies the industrial machine 120 that has the machine identifier indicated by the machine-readable symbol on the industrial machine 120 matching the machine identifier provided by the TMMS 104. To scan a machine-readable symbol on an industrial machine 120, the on-premises robot 140 may be located at a position proximate to the industrial machine 120. Accordingly, when the on-premises robot 140 scans the machine-readable symbol that indicates the machine identifier matching the machine identifier provided by the TMMS 104, the on-premises robot 140 may be located at the position proximate to the industrial machine 120 selected by the user that has the machine identifier provided to the on-premises robot 140 by the TMMS 104. Other implementations for controlling the on-premises robot 140 to move to the position proximate to the industrial machine 120 are also possible and contemplated.

Figure 5A:
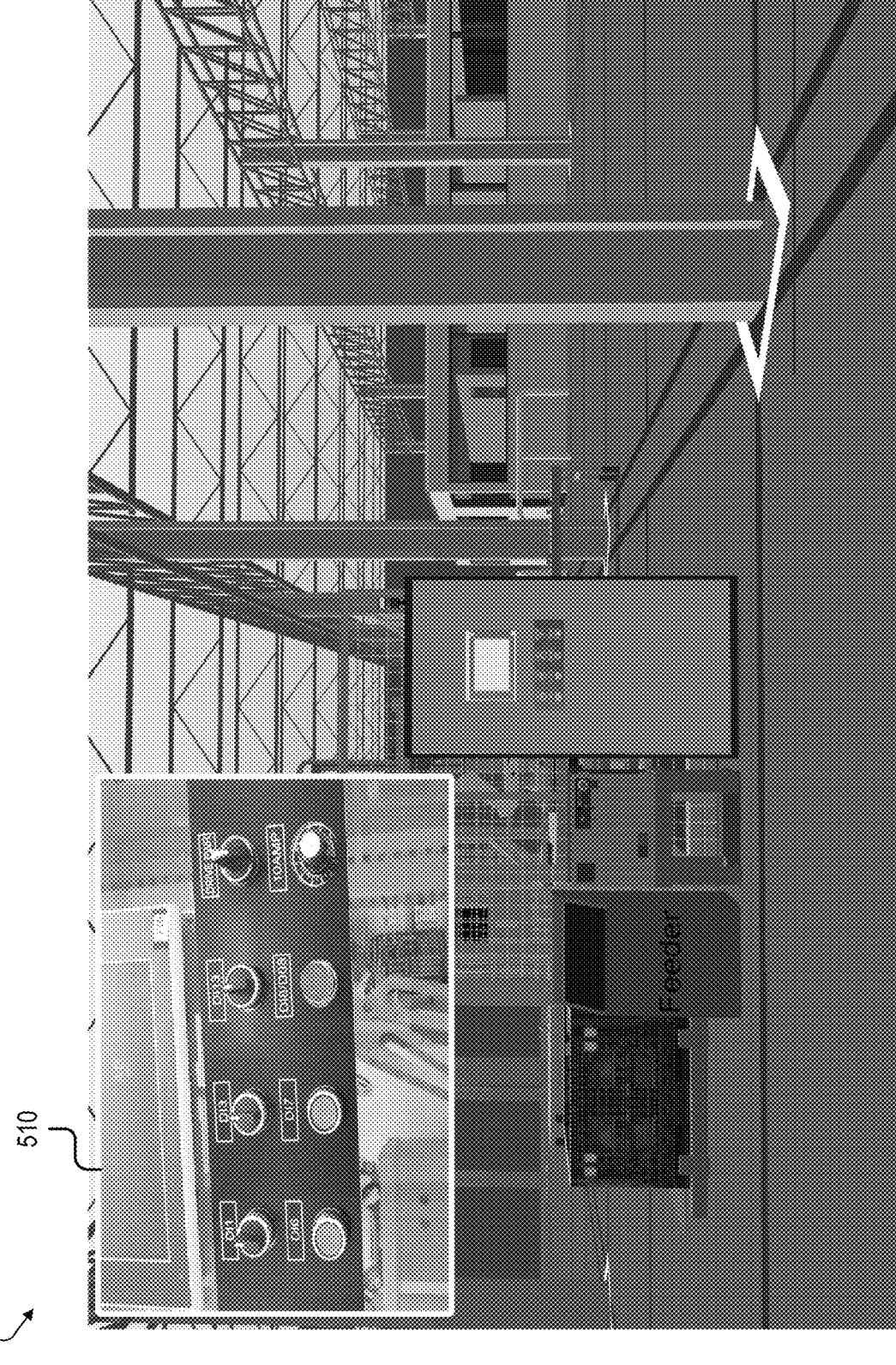

In some embodiments, when the on-premises robot 140 is at the position proximate to the industrial machine 120, the on-premises robot 140 may be located in front of the industrial machine 120 and the industrial machine 120 may be depicted in the video stream captured by the on-premises robot 140. In some embodiments, the video stream captured by the on-premises robot 140 may be presented in the industrial digital twin 106 to the user, and thus the user may view one or more video images in the video stream that depict one or more input devices (e.g., buttons, switches) of the industrial machine 120. As an example, FIG. 5A illustrates an example interface 500 presented in the industrial digital twin 106 to the user. As depicted in FIG. 5A, the interface 500 may include a camera view 510 associated with the on-premises robot 140, and the video stream captured by the on-premises robot 140 may be displayed in the camera view 510 to the user. When the on-premises robot 140 is located in front of the industrial machine 120 at the position proximate to the industrial machine 120, the on-premises robot 140 may capture one or more video images that depict multiple input devices of the industrial machine 120 in its video stream, and the user may view these video images in the camera view 510 as depicted in FIG. 5A.

In some embodiments, the user may control the on-premises robot 140 to physically interact with the industrial machine 120 selected by the user that is depicted in the video images captured by the on-premises robot 140. For example, to adjust an operation of the industrial machine 120 such as powering on the industrial machine 120 to switch the industrial machine 120 from an off state to an on state, the user may cause the on-premises robot 140 to make a physical contact with an input device of the industrial machine 120 and press, rotate, actuate, disengage, or otherwise physically interact with the input device of the industrial machine 120.

In some embodiments, to cause the on-premises robot 140 to physically interact with an input device of the industrial machine 120, the user may provide a user request to select an input device of the industrial machine 120. The user request to select an input device of the industrial machine 120 may be provided by the user via the industrial digital twin 106 when the industrial machine 120 and its input devices are depicted in the video stream presented in the industrial digital twin 106 to the user. In some embodiments, in response to the user request, the TMMS 104 may obtain a particular video image that is captured by the on-premises robot 140 most recently. The particular video image may depict one or more input devices of the industrial machine 120, and the TMMS 104 may perform an image processing operation on the particular video image.

For example, the TMMS 104 may input the particular video image into a machine learning model. The machine learning model may detect the input devices (e.g., buttons, switches, etc.) of the industrial machine 120 that are depicted in the particular video image. For each input device detected in the particular video image, the machine learning model may also identify an input device category of the input device. The input device category may indicate a type of input device (e.g., a push button, an emergency button, a rotary switch, a toggle switch, etc.) to which the input device belongs. In some embodiments, each input device category may have a category profile including various information about the type of input device indicated by the input device category. For example, the category profile of the input device category may indicate an interaction operation (e.g., a pressing operation, a rotation operation, etc.) to be performed on an input device that belongs to the input device category to manipulate the input device. In some embodiments, an input device detected in the particular video image may include multiple selectable states. For example, the input device may be a rotary switch that includes multiple selectable switch positions. In this case, the machine learning model may also identify the selectable states of the input device and a current state among the selectable states of the input device as depicted in the particular video image.

In some embodiments, for each input device depicted in the particular video image and detected by the machine learning model, the TMMS 104 may assign an input device identifier (e.g., push button 1, toggle switch 2, emergency button 3, etc.) that uniquely identifies the input device among the input devices detected in the particular video image. In some embodiments, the industrial machine 120 depicted in the particular video image may include an input device label associated with each input device. For example, as depicted in FIG. 5A, the industrial machine 120 may include 8 input devices and each input device may have an input device label positioned above the input device. In this case, for each input device detected in the particular video image, the machine learning model may detect the input device label associated with the input device in the particular video image, and determine a text content of the input device label. The TMMS 104 may then assign an input device identifier that matches the text content of the input device label to the input device. In some embodiments, the TMMS 104 may generate a list of input devices including the input device identifier of each input device depicted in the particular video image and detected by the machine learning model. The list of input devices may also indicate the input device category of each input device.

In some embodiments, the TMMS 104 may generate a display image based on the particular video image captured by the on-premises robot 140. For example, based on the detection result of the machine learning model, the TMMS 104 may add one or more graphical elements (e.g., one or more bounding boxes) to the particular video image in which each graphical element (e.g., each bounding box) may respectively indicate an input device detected in the particular video image. In some embodiments, if the industrial machine 120 does not include an input device label for each input device and therefore the input device label of each input device is not depicted in the particular video image, the TMMS 104 may add the input device identifier generated by the TMMS 104 for each input device to the particular video image at a position relative to a position of the input device in the particular video image. For example, the TMMS 104 may add the input device identifier of the input device to the particular video image at a position that has an image distance between the input device identifier and the input device in the particular video image satisfying a predefined distance threshold (e.g., less than 2 mm). On the other hand, if the industrial machine 120 includes an input device label for each input device and therefore the input device label of each input device is depicted in the particular video image, the TMMS 104 may assign to each input device the input device identifier that matches the text content of the input device label associated with the input device as described above. Thus, in this case, because the input device label of the input device is depicted in the particular video image and indicates the input device identifier of the input device, the TMMS 104 may not add an additional input device identifier of the input device to the particular video image to avoid redundancy.

Accordingly, by adding the graphical elements (e.g., the bounding boxes) to the particular video image and adding the input device identifiers to the particular video image if necessary, the TMMS 104 may generate the display image from the particular video image in which the display image not only indicates each input device of the industrial machine 120 that is detected in the particular video image but also indicates the input device identifier of that input device. In some embodiments, the TMMS 104 may present the display image instead of the particular video image and also present the list of input devices together with the display image in the industrial digital twin 106 to the user. As described herein, the list of input devices may include the input device identifier of each input device detected in the particular video image by the machine learning model and also indicate the input device category of each input device. In addition, for an input device detected in the particular video image that includes multiple selectable states (e.g., a rotary switch that includes multiple selectable switch positions), the TMMS 104 may also present a list of selectable states associated with the input device to the user in the industrial digital twin 106. In some embodiments, the list of selectable states may indicate various selectable states of the input device and also indicate a current state of the input device (e.g., a current switch position of the rotary switch) as detected by the machine learning model or indicated in the digital twin data of the industrial digital twin 106. In some embodiments, the list of selectable states associated with the input device may only be presented when the input device is in focus in the list of input devices.

Figure 5B:
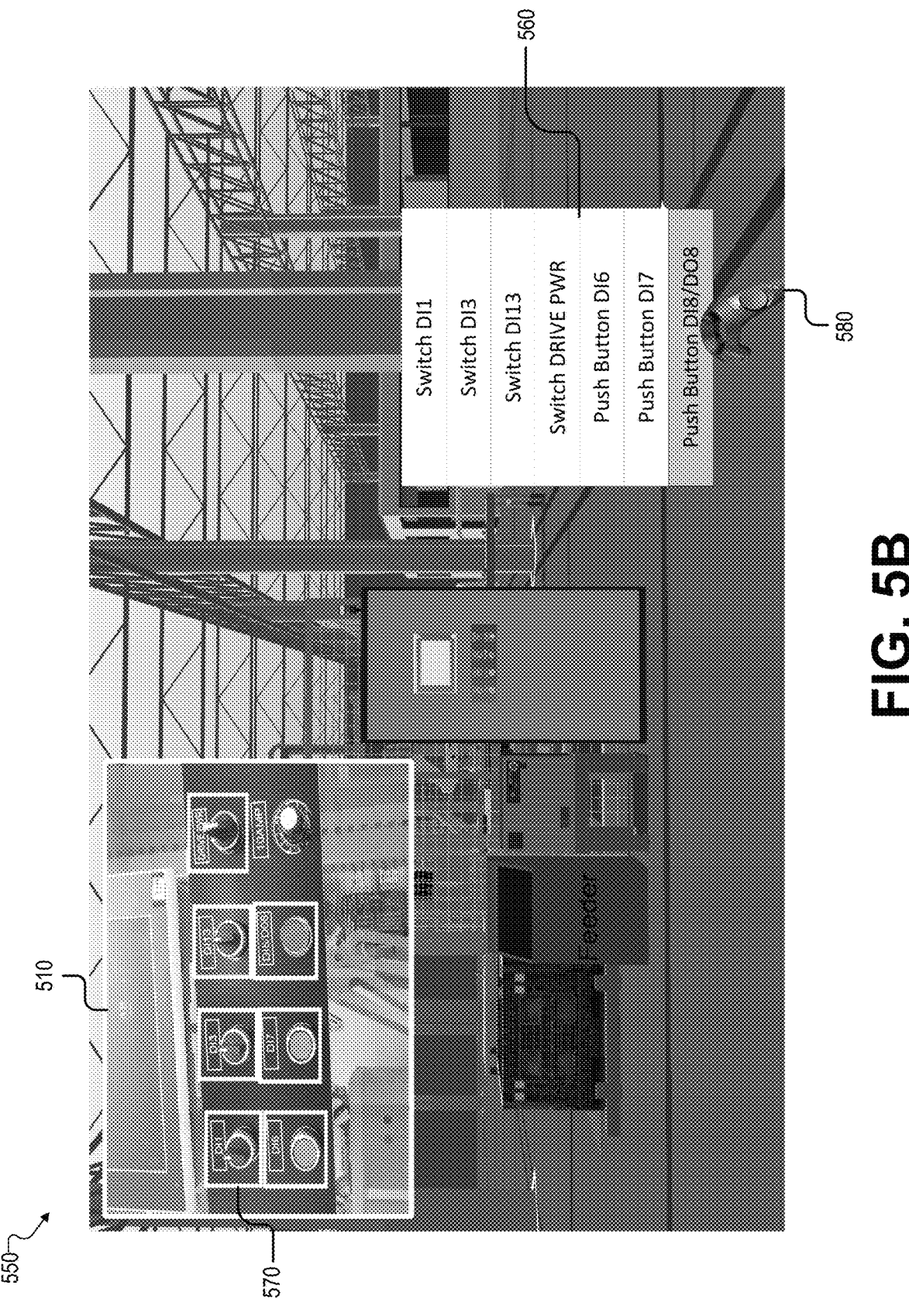

As an example, FIG. 5B illustrates an example interface 550 presented in the industrial digital twin 106 to the user. The interface 550 in FIG. 5B may be presented after the interface 500 in FIG. 5A is presented. For example, as described herein with reference to FIG. 5A, a video image that depicts the industrial machine 120 and its input devices may be displayed in the camera view 510 associated with the on-premises robot 140 in the interface 500. The user may view the video image and provide the user request to select an input device of the industrial machine 120 accordingly. In response to the user request to select an input device of the industrial machine 120, the TMMS 104 may generate a display image and a list of input devices 560 as described above, and present the display image and the list of input devices 560 in the interface 550 to the user. As described above, the display image may be generated based on the particular video image captured by the on-premises robot 140 and may be presented in the camera view 510 associated with the on-premises robot 140 in the interface 550 as depicted in FIG. 5B. The display image may include bounding boxes 570, in which each bounding box 570 encompasses an input device of the industrial machine 120 detected by the machine learning model.

In this example, the industrial machine 120 may include 8 input devices and the machine learning model may detect 7 input devices of the industrial machine 120 in the particular video image. In particular, the industrial machine 120 may include input devices DI1, DI3, DI13, DRIVE PWR, DI6, DI7, DI8/DO8, 10 AMP, and the machine learning model may detect the input devices DI1, DI3, DI13, DRIVE PWR, DI6, DI7, DI8/DO8 in the particular video image. Accordingly, the display image may include 7 bounding boxes indicating 7 input devices detected by the machine learning model and the list of input devices 560 may include the input device identifiers of 7 input devices detected by the machine learning model. In this example, the industrial machine 120 may include an input device label positioned above each input device. Accordingly, the input device identifier of each input device in the list of input devices 560 may match the text content (e.g., DI1, DI6, etc.) of the input device label positioned above that input device on the industrial machine 120 as depicted in FIG. 5B. The list of input devices 560 may also indicate the input device category (e.g., switch, push button, etc.) of each input device as depicted in FIG. 5B.

In some embodiments, in response to the display image and the list of input devices being presented in the industrial digital twin 106 to the user, the user may provide a user selection specifying a target input device in the list of input devices, thereby requesting the on-premises robot 140 to physically interact with the target input device of the industrial machine 120 in the physical industrial facility 102. Alternatively, the user may provide one or more user selections that specify not only a target input device in the list of input devices, but also specify a target state in the list of selectable states associated with the target input device in case the target input device includes multiple selectable states. Thus, by providing the user selection(s) of the target input device and the target state of the target input device, the user may request the on-premises robot 140 to physically interact with the target input device to select the target state of the target input device on the industrial machine 120 in the physical industrial facility 102. Continuing the example in FIGS. 5A and 5B, the user may provide a user selection specifying the input device DI8/DO8 in the list of input devices 560 as the target input device. In this example, the user may provide the user selection of the input device DI8/DO8 as the target input device using a control handle represented by a virtual control handle 580 in the industrial digital twin 106 as depicted in FIG. 5B.

In some embodiments, in response to the user selection of the target input device or the user selection(s) of the target input device and the target state of the target input device, the TMMS 104 may generate one or more control commands for the on-premises robot 140 accordingly. In some embodiments, the control commands generated for the on-premises robot 140 may indicate one or more operations to be performed by the on-premises robot 140 to physically interact with the target input device of the industrial machine 120 as requested by the user. To generate the control commands, the TMMS 104 may determine one or more operations to be performed by the robotic arm and the robotic hand of the on-premises robot 140 to reach the target input device of the industrial machine 120 and manipulate the target input device of the industrial machine 120. For example, the operations may include one or more arm movements to be performed by the robotic arm of the on-premises robot 140 to reach the target input device of the industrial machine 120. The operations may also include an interaction operation to be performed by the robotic hand of the on-premises robot 140 on the target input device of the industrial machine 120 when the robotic arm of the on-premises robot 140 reaches the target input device and therefore the robotic hand of the on-premises robot 140 is in physical contact with the target input device.

In some embodiments, the arm movements to be performed by the robotic arm of the on-premises robot 140 to reach the target input device of the industrial machine 120 may include one or more arm alignment movements to align the robotic arm of the on-premises robot 140 with the target input device and one or more arm forward movements to move the robotic arm of the on-premises robot 140 forward towards the target input device. In some embodiments, to determine the arm alignment movements for the robotic arm of the on-premises robot 140, the TMMS 104 may determine a relative location of the target input device relative to the robotic arm of the on-premises robot 140. For example, the TMMS 104 may determine one or more relative positions of the target input device in one or more video images of the video stream that are captured by the robot camera 142 of the on-premises robot 140, and determine a relative location of the target input device relative to the robot camera 142 of the on-premises robot 140 based on the relative positions of the target input device in these video images. The TMMS 104 may also reference the digital twin data of the industrial digital twin 106 to obtain the arm position of the on-premises robot 140 and the camera position of the on-premises robot 140 as indicated in the data associated with the on-premises robot 140, and determine a relative location of the robotic arm of the on-premises robot 140 relative to the robot camera 142 of the on-premises robot 140 based on the arm position and the camera position of the on-premises robot 140. The TMMS 104 may then determine the relative location of the target input device relative to the robotic arm of the on-premises robot 140 based on the relative location of the target input device relative to the robot camera 142 of the on-premises robot 140 and the relative location of the robotic arm of the on-premises robot 140 relative to the robot camera 142 of the on-premises robot 140.

In some embodiments, after the relative location of the target input device relative to the robotic arm of the on-premises robot 140 is determined, the TMMS 104 may determine the arm movements for the robotic arm of the on-premises robot 140 to reach the target input device based on the relative location of the target input device relative to the robotic arm of the on-premises robot 140. For example, based on the relative location of the target input device relative to the robotic arm of the on-premises robot 140, the TMMS 104 may determine the arm alignment movements to align the robotic arm of the on-premises robot 140 with the target input device. For example, the TMMS 104 may determine that the arm alignment movements to align the robotic arm of the on-premises robot 140 with the target input device include moving the robotic arm of the on-premises robot 140 to the left 5 cm and moving the robotic arm of the on-premises robot 140 upward 15°.

In some embodiments, the TMMS 104 may generate one or more first control commands specifying the arm alignment movements and the arm forward movements and transmit the first control commands to the on-premises robot 140, thereby instructing the on-premises robot 140 to perform the arm movements specified in the first control commands. In some embodiments, in response to receiving the first control commands from the TMMS 104, the on-premises robot 140 may execute the first control commands to perform these arm movements with its robotic arm, thereby causing the robotic arm to reach the target input device of the industrial machine 120. In some embodiments, when executing the first control commands, the on-premises robot 140 may perform the arm alignment movements and the arm forward movements simultaneously. Additionally or alternatively, the on-premises robot 140 may perform the arm alignment movements to align the robotic arm of the on-premises robot 140 with the target input device first, and then perform one or more arm forward movements to move the robotic arm of the on-premises robot 140 forwards towards the target input device.

In some embodiments, when the on-premises robot 140 performs the arm movements to reach the target input device, the TMMS 104 may frequently update the relative location of the target input device relative to the robotic arm of the on-premises robot 140. For example, the TMMS 104 may re-determine the relative location of the target input device relative to the robotic arm of the on-premises robot 140 in the manner described above at a predefined interval (e.g., every 1 s). In some embodiments, based on the updated relative location of the target input device relative to the robotic arm of the on-premises robot 140, the TMMS 104 may determine one or more different arm movements for the robotic arm of the on-premises robot 140 to reach the target input device. The different arm movements may include at least one arm movement (e.g., an arm alignment movement) different from the arm movements that the TMMS 104 previously determines and specifies in the first control commands transmitted to the on-premises robot 140.

In some embodiments, the TMMS 104 may generate one or more second control commands specifying the different arm movements, and transmit the second control commands to the on-premises robot 140. Accordingly, the TMMS 104 may instruct the on-premises robot 140 to stop performing the arm movements specified in the first control commands and perform the different arm movements specified in the second control commands instead. In some embodiments, in response to receiving the second control commands from the TMMS 104, the on-premises robot 140 may stop executing the first control commands, and execute the second control commands to perform the different arm movements with its robotic arm to reach the target input device of the industrial machine 120. Thus, as the on-premises robot 140 operates its robotic arm to reach the target input device, the TMMS 104 may frequently provide control commands to the on-premises robot 140 to instruct the on-premises robot 140 in dynamically adjusting its robotic arm to reach the target input device accurately.

As described herein, the robotic arm of the on-premises robot 140 may include the robotic hand at the distal end of the robotic arm and the robotic hand may include a touch sensor. In some embodiments, based on a sensor output of the touch sensor, the on-premises robot 140 may determine that the robotic hand of the on-premises robot 140 is in physical contact with the target input device of the industrial machine 120, and therefore determine that the robotic arm of the on-premises robot 140 successfully reaches the target input device of the industrial machine 120. In response to such determination, the on-premises robot 140 may transmit a corresponding notification to the TMMS 104.

In some embodiments, in response to the notification from the on-premises robot 140 indicating that the robotic arm of the on-premises robot 140 reaches the target input device of the industrial machine 120 and the robotic hand of the on-premises robot 140 is in physical contact with the target input device of the industrial machine 120, the TMMS 104 may determine the interaction operation to be performed by the robotic hand of the on-premises robot 140 on the target input device. To determine the interaction operation, the TMMS 104 may determine the input device category of the target input device. If the target input device includes multiple selectable states, the TMMS 104 may also determine the current state of the target input device. For example, the TMMS 104 may obtain the input device category of the target input device and/or the current state of the target input device as detected in the particular video image by the machine learning model and/or indicated by the data associated with the industrial machine 120 in the digital twin data of the industrial digital twin 106. The TMMS 104 may then determine the interaction operation to be performed by the robotic hand of the on-premises robot 140 on the target input device based on one or more of the input device category of the target input device, the current state of the target input device, and the target state of the target input device selected by the user. For example, the TMMS 104 may reference the category profile associated with the input device category of the target input device, and determine the interaction operation specified in the category profile as the interaction operation to be performed on the target input device.

As an example, the target input device may be a push button such as the input device DI8/DO8 as depicted in FIG. 5B. In this case, the TMMS 104 may reference the category profile of the input device category "push button," and determine that the interaction operation to be performed on a push button is a pressing operation. Thus, in this case, the TMMS 104 may determine that the interaction operation to be performed on the target input device is the pressing operation.

As another example, the target input device may be a rotary switch in which the current state of the target input device is a switch position 3 and the target state of the target input device selected by the user is a switch position 5. In this case, the TMMS 104 may reference the category profile of the input device category "rotary switch," and determine that the interaction operation to be performed on a rotary switch is a rotation operation. Thus, in this case, the TMMS 104 may determine that the interaction operation to be performed on the target input device is the rotation operation in which the rotary switch is rotated in a clockwise direction by 2 positions from the switch position 3 to the switch position 5.

In some embodiments, after the interaction operation to be performed by the robotic hand of the on-premises robot 140 on the target input device is determined, the TMMS 104 may generate a control command instructing the on-premises robot 140 to perform the interaction operation on the target input device using its robotic hand when the robotic hand of the on-premises robot 140 is in physical contact with the target input device. The TMMS 104 may then transmit the control command to the on-premises robot 140. In response to receiving the control command from the TMMS 104, the on-premises robot 140 may execute the control command to perform the interaction operation on the target input device with its robotic hand as the robotic hand of the on-premises robot 140 is in physical contact with the target input device. Accordingly, the on-premises robot 140 may operate its robotic hand to manipulate the target input device and physically interact with the target input device of the industrial machine 120 as requested by the user.

In some embodiments, when the on-premises robot 140 moves its robotic arm towards the industrial machine 120 to interact with the target input device of the industrial machine 120, the robotic arm and the robotic hand of the on-premises robot 140 may enter the field of view of the robot camera 142 of the on-premises robot 140, and therefore the robotic arm and the robotic hand of the on-premises robot 140 may be included in one or more video images captured by the on-premises robot 140 in its video stream. Thus, the user may view these video images in the camera view associated with the on-premises robot 140 presented in the industrial digital twin 106 to the user, and therefore the user may see the robotic arm and the robotic hand of the on-premises robot 140 when the robotic arm of the on-premises robot 140 approaches the industrial machine 120 and the robotic hand of the on-premises robot 140 manipulates the target input device of the industrial machine 120.

Figure 5C:
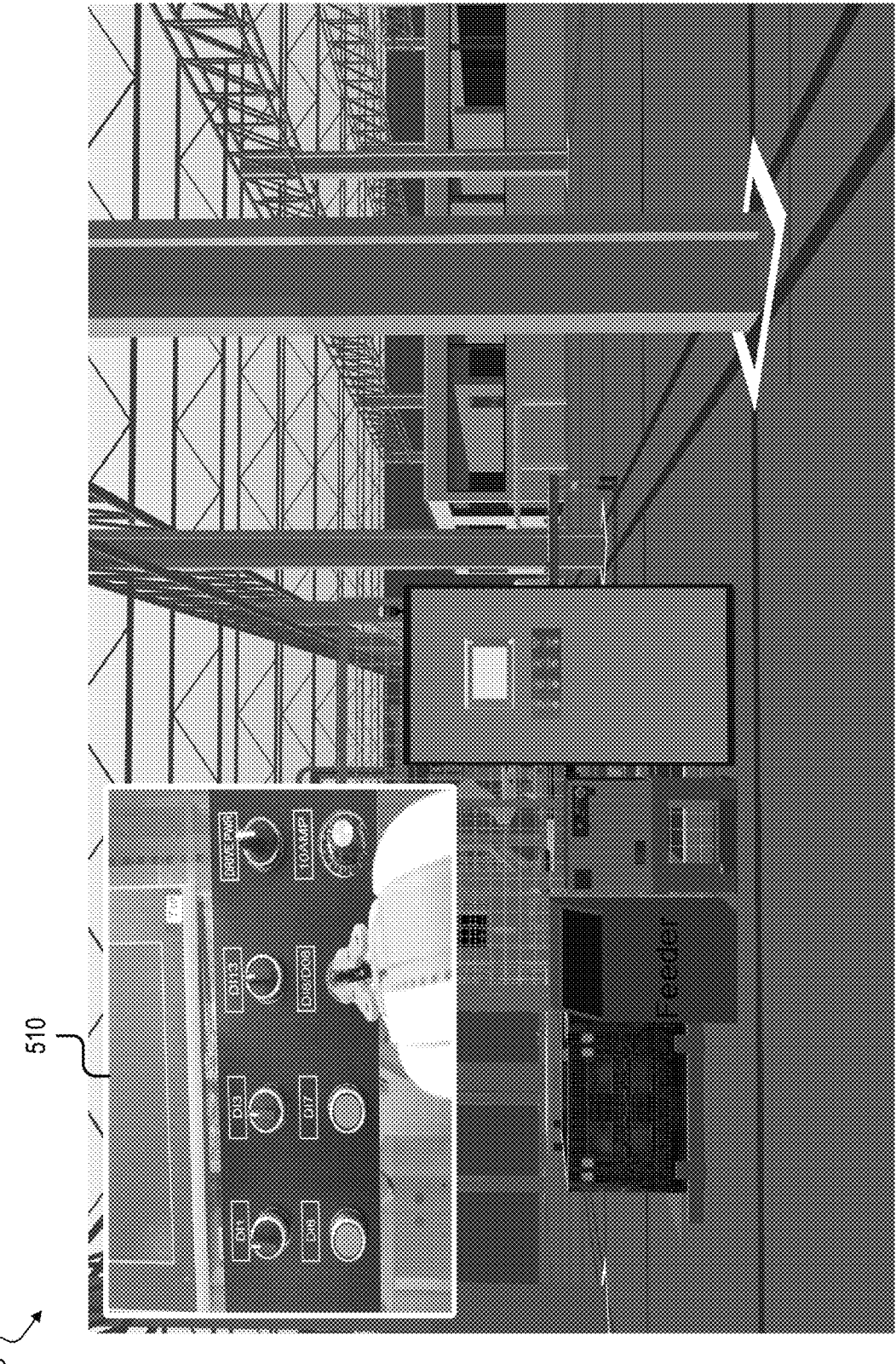

As an example, FIG. 5C illustrates an example interface 590 presented in the industrial digital twin 106 to the user. The interface 590 in FIG. 5C may be presented after the interface 550 in FIG. 5B is presented. As described herein with reference to FIG. 5B, the user may provide the user selection of the input device DI8/DO8 as the target input device. In response to the user selection of the input device DI8/DO8, the TMMS 104 may determine the operations to be performed by the on-premises robot 140 to physically interact with the input device DI8/DO8 as requested by the user. The TMMS 104 may then generate the control commands instructing the on-premises robot 140 to perform these operations, and transmit the control commands to the on-premises robot 140. In response to receiving the control commands from the TMMS 104, the on-premises robot 140 may execute the control commands to perform the operations using its robotic arm and robotic hand, thereby physically interacting with the input device DI8/DO8. As the robotic arm of the on-premises robot 140 approaches the input device DI8/DO8 and the robotic hand of the on-premises robot 140 manipulates the input device DI8/DO8, the user may view the robotic arm and the robotic hand of the on-premises robot 140 in the camera view 510 associated with the on-premises robot 140 as depicted in FIG. 5C. For example, the user may view the video image displayed in the camera view 510 that depicts the robotic arm and the robotic hand of the on-premises robot 140 when the robotic hand of the on-premises robot 140 is in physical contact with the input device DI8/DO8 and pushes the input device DI8/DO8 as depicted in FIG. 5C.

In some embodiments, after the on-premises robot 140 executes the control command and the interaction operation indicated in the control command is performed on the target input device of the industrial machine 120, the on-premises robot 140 may transmit a notification to the TMMS 104 indicating that the interaction operation has been performed on the target input device of the industrial machine 120. In response to this notification, the TMMS 104 may present in the industrial digital twin 106 a completion notification to the user indicating that the physical interaction with the target input device of the industrial machine 120 requested by the user is completed.

Thus, as described above, the on-premises robot 140 may perform the operations (e.g., the arm movements, the interaction operation, etc.) instructed by the TMMS 104 to physically interact with the target input device of the industrial machine 120. In some embodiments, after the on-premises robot 140 physically interacts with the target input device of the industrial machine 120, the operations of the industrial machine 120 may change. For example, the industrial machine 120 may be powered on and may switch from the off state to the on state. In some embodiments, subsequent to the on-premises robot 140 executing the control commands to physically interact with the target input device of the industrial machine 120, the TMMS 104 may receive the data associated with the industrial machine 120 from the industrial machine 120 and/or from the edge device 130. The data associated with the industrial machine 120 may indicate the change of the industrial machine 120 caused by the on-premises robot 140 executing the control commands and physically interacting with the target input device of the industrial machine 120. In some embodiments, the TMMS 104 may update the industrial digital twin 106 based on the data associated with the industrial machine 120 to reflect the change of the industrial machine 120 in the industrial digital twin 106. For example, the TMMS 104 may update the information associated with the virtual representation of the industrial machine 120 in the industrial digital twin 106 to change the operation status of the industrial machine 120 indicated in the information from the off state to the on state.

Thus, as described herein, the TMMS 104 may generate the list of input devices including the input device identifier of each input device on the industrial machine 120 that is detected by the machine learning model in the particular video image. The TMMS 104 may also generate the display image that indicates each input device of the industrial machine 120 detected by the machine learning model in the particular video image and also indicates the input device identifier of that input device. As described herein, the TMMS 104 may present the list of input devices together with the display image in the industrial digital twin 106 to the user. Accordingly, the TMMS 104 may facilitate the user in selecting the target input device of the industrial machine 120 to be physically interacted with by the on-premises robot 140.

In addition, after the user selects the target input device of the industrial machine 120, the TMMS 104 may determine the operations (e.g., the arm movements, the interaction operation, etc.) to be performed by the on-premises robot 140 to physically interact with the target input device of the industrial machine 120, and instruct the on-premises robot 140 to perform these operations. Thus, the TMMS 104 may automatically control the on-premises robot 140 to physically interact with the target input device of the industrial machine 120 with the on-premises robot 140 operating in the automated control mode. Accordingly, the TMMS 104 may eliminate the need for the user to manually control the on-premises robot 140 in which the user has to specify various operations to be performed by the robotic arm and/or the robotic hand of the on-premises robot 140 to reach the target input device of the industrial machine 120 and manipulate the target input device of the industrial machine

120. As a result, the user input provided by the user for causing the on-premises robot 140 to physically interact with the target input device of the industrial machine 120 may be significantly simplified, the accuracy of the on-premises robot 140 in interacting with the target input device of the industrial machine 120 may be improved, and therefore user experience of the user may also be improved.

In some embodiments, the industrial machine 120 may include a particular input device that is depicted in the particular video image captured by the on-premises robot 140 but is not detected by the machine learning model. For example, the particular input device may belong to a type of input device that the machine learning model has not been trained to detect, and therefore the machine learning model cannot detect the particular input device in the particular video image captured by the on-premises robot 140. In the example depicted in FIGS. 5A-5B, the industrial machine 120 may include the input device 10 AMP that is depicted in the video image captured by the on-premises robot 140 but is not detected by the machine learning model. Accordingly, the input device 10 AMP may not be indicated by a bounding box 570 and may not have its input device identifier included in the list of input devices 560 as depicted in FIG. 5B.

In some embodiments, the user may manually control the on-premises robot 140 to physically interact with the particular input device of the industrial machine 120 that is not detected in the particular video image by the machine learning model. To manually control the on-premises robot 140 to physically interact with the particular input device, the user may provide a first user request to enter the on-premises robot 140 in the manual control mode. The first user request may be provided via the industrial digital twin 106 when the particular input device of the industrial machine 120 is depicted in the particular video image and the machine learning model implemented by the TMMS 104 does not detect the particular input device in the particular video image. In this case, the user may view the particular input device in the display image generated based on the particular video image, but the particular input device is not selectable because the particular input device is not detected by the machine learning model and therefore its input device identifier is not included in the list of input devices presented to the user. In some embodiments, the TMMS 104 may receive the first user request provided by the user via the industrial digital twin 106 and enter the on-premises robot 140 in the manual control mode accordingly. As described herein, when the on-premises robot 140 operates in the manual control mode, the TMMS 104 may not determine the operations to be performed by the on-premises robot 140 to carry out a physical task. Instead, the user may specify the operations to be performed by the on-premises robot 140 to carry out the physical task in one or more user requests, and the TMMS 104 may instruct the on-premises robot 140 to perform the operations specified by the user.

In some embodiments, when the on-premises robot 140 operates in the manual control mode as a result of the first user request, the user may provide one or more second user requests specifying one or more particular operations to be performed by the on-premises robot 140 to physically interact with the particular input device of the industrial machine 120. The second user requests may be provided by the user via the industrial digital twin 106 in sequence. In some embodiments, the second user requests may specify one or more arm movements to be performed by the robotic arm of the on-premises robot 140 to reach the particular input device of the industrial machine 120. For example, the second user requests may specify that the arm movements to be performed by the robotic arm of the on-premises robot 140 include moving the robotic arm of the on-premises robot 140 to the right 7 cm and moving the robotic arm of the on-premises robot 140 downward 2 cm. In some embodiments, the second user requests may also specify an interaction operation to be performed by the robotic hand of the on-premises robot 140 to manipulate the particular input device of the industrial machine 120 when the robotic hand of the on-premises robot 140 is in physical contact with the particular input device of the industrial machine 120. For example, the second user requests may specify that the interaction operation to be performed by the robotic hand of the on-premises robot 140 on the particular input device is a press-and-rotate operation.

In some embodiments, the TMMS 104 may receive the second user requests provided by the user and generate one or more particular control commands for the on-premises robot 140 based on the second user requests. For example, the TMMS 104 may generate the particular control commands instructing the on-premises robot 140 to perform the particular operations specified in the second user requests to physically interact with the particular input device of the industrial machine 120, and transmit the particular control commands to the on-premises robot 140 in the physical industrial facility 102. In response to receiving the particular control commands from the TMMS 104, the on-premises robot 140 may execute the particular control commands and perform the particular operations specified by the user, and thus the user may manually control the on-premises robot 140 to physically interact with the particular input device of the industrial machine 120.

In some embodiments, when the on-premises robot 140 executes the particular control commands to perform the particular operations and physically interact with the particular input device of the industrial machine 120, the robotic arm and the robotic hand of the on-premises robot 140 may enter the field of view of the robot camera 142 of the on-premises robot 140, and therefore the robotic arm and the robotic hand of the on-premises robot 140 may be included in one or more video images captured by the on-premises robot 140 in its video stream. Thus, the user may view these video images in the camera view associated with the on-premises robot 140 presented in the industrial digital twin 106 to the user, and therefore the user may see the robotic arm and the robotic hand of the on-premises robot 140 when the robotic arm of the on-premises robot 140 approaches the particular input device of the industrial machine 120 and the robotic hand of the on-premises robot 140 manipulates the particular input device of the industrial machine 120 under the manual control of the user via the industrial digital twin 106.

In some embodiments, for each user request among the second user requests provided by the user in sequence, the TMMS 104 may generate a particular control command instructing the premises robot 140 to perform one or more first operations specified in the user request, and transmit the particular control command to the on-premises robot 140 as described above. After the on-premises robot 140 executes the particular control command and performs the first operations, the on-premises robot 140 transmit a notification to the TMMS 104 indicating that the first operations specified in the particular control command have been performed. In response to this notification, the TMMS 104 may present in the industrial digital twin 106 a completion notification to the user indicating that the first operations specified in the user request have been performed and the user request is completed.

At this point, the user may provide a subsequent user request via the industrial digital twin 106 as part of the second user requests. The subsequent user request may specify one or more second operations to be performed by the on-premises robot 140 after the first operations to reach the particular input device of the industrial machine 120 and/or manipulate the particular input device of the industrial machine 120. The TMMS 104 may then generate an additional control command for the on-premises robot 140 based on the subsequent user request, and the on-premises robot 140 may execute the additional control command to perform the second operations accordingly. Thus, by sequentially providing the second user requests via the industrial digital twin 106 in which each second user request specifies one or more of the particular operations to be sequentially performed by the on-premises robot 140, the user may manually control the on-premises robot 140 through the industrial digital twin 106 and cause the on-premises robot 140 to physically interact with the particular input device of the industrial machine 120.

In some embodiments, when the user manually controls the on-premises robot 140 to interact with the particular input device of the industrial machine 120 under the manual control mode, the TMMS 104 may collect and analyze relevant data to enable the user in controlling the on-premises robot 140 to interact with a similar input device under the automated control mode. For example, the TMMS 104 may collect various video images that can be used to train the machine learning model in detecting an input device that is similar to the particular input device of the industrial machine 120 in video images. In some embodiments, the input device that is similar to the particular input device of the industrial machine 120 may belong to the same input device category as the particular input device and may be referred to herein as the similar input device or the input device similar to the particular input device for simplification.

In some embodiments, when the user manually controls the on-premises robot 140 to physically interact with the particular input device of the industrial machine 120 under the manual control mode, the robotic arm of the on-premises robot 140 may move towards the particular input device of the industrial machine 120 to reach the particular input device. As the robotic arm of the on-premises robot 140 approaches the particular input device, the distance between the robotic hand of the on-premises robot 140 and the particular input device may decrease, the robotic arm and the robotic hand of the on-premises robot 140 may enter the field of view of the robot camera 142 of the on-premises robot 140, and therefore the video stream captured by the on-premises robot 140 may include one or more video images that depict both the particular input device and the robotic hand of the on-premises robot 140 in vicinity of the particular input device.

In some embodiments, the TMMS 104 may identify a reference image in the video stream that depicts the robotic hand of the on-premises robot 140 being proximate to the particular input device. The robotic hand of the on-premises robot 140 may be at a position proximate to the particular input device when the on-premises robot 140 executes the particular control commands to physically interact with the particular input device under the manual control mode as described above. In some embodiments, the TMMS 104 may select, from the video images captured by the on-premises robot 140 when the on-premises robot 140 executes the particular control commands to physically interact with the particular input device, a video image that has a distance in the video image between the particular input device and the robotic hand of the on-premises robot 140 depicted in the video image satisfying a predefined proximity threshold (e.g., less than 1 mm), and identify the video image to be the reference image. In some embodiments, the TMMS 104 may analyze the reference image to determine an input device appearance of the particular input device that is approached by the robotic hand of the on-premises robot 140 as depicted in the reference image. For example, the TMMS 104 may perform one or more image processing operations on the reference image to determine the shape, the color, the design pattern, and/or other appearance aspects of the particular input device depicted in the reference image.

In some embodiments, based on the input device appearance of the particular input device in the reference image, the TMMS 104 may identify one or more video images that depict the particular input device in the video stream captured by the on-premises robot 140. For example, the TMMS 104 may identify the video images in the video stream that include an object with an object appearance matching the input device appearance of the particular input device. The TMMS 104 may then provide the identified video images to a training system to train the machine learning model implemented by the TMMS 104. For example, the training system may use these video images as part of the training data to train the machine learning model in detecting an input device that belongs to the same input device category as the particular input device in video images. In some embodiments, the user may manually control the on-premises robot 140 to move to different positions relative to the particular input device of the industrial machine 120 under the manual control mode, and thus the video stream captured by the on-premises robot 140 may include various video images that capture the particular input device at different angles and/or at different distances. As described above, the TMMS 104 may identify these video images in the video stream and provide these video images as training data to train the machine learning model. Accordingly, the machine learning model may be trained to detect the input device that belongs to the same input device category as the particular input device with comprehensive training data.

Figure 6:
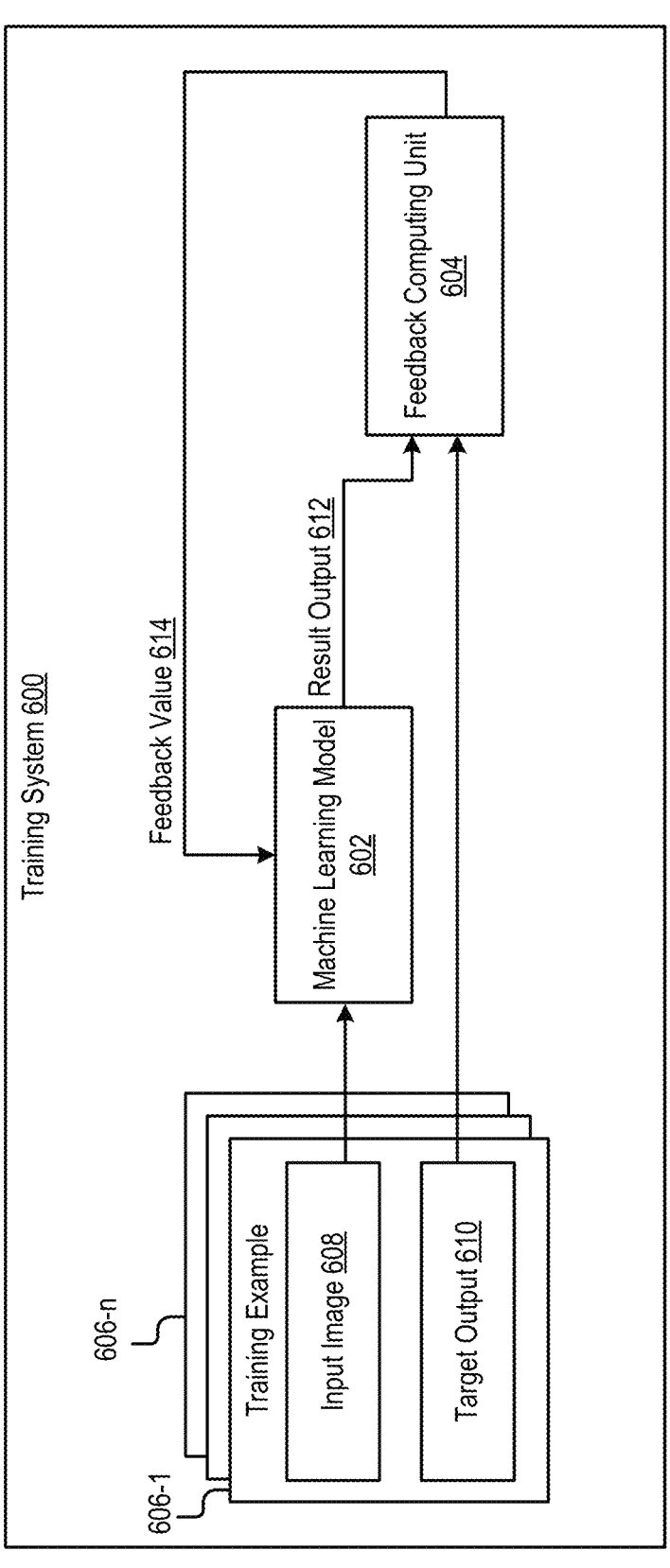
FIG. 6 illustrates an example training system for training a machine learning model.

FIG. 6 illustrates an example training system 600 for training the machine learning model implemented by the TMMS 104. The training system 600 may continuously train the machine learning model on a regular basis to enable the machine learning model in detecting various input devices and other objects in video images. In some embodiments, the training system 600 may be implemented on the TMMS 104, the edge device 130, and/or other components of the system 100. In some embodiments, various components of the system 100 may collaborate with one another to perform one or more functionalities of the training system 600 described herein.

As depicted in FIG. 6, the training system 600 may include a machine learning model 602 and a feedback computing unit 604. In some embodiments, the machine learning model 602 may be deployed in the TMMS 104 after training and may be implemented using one or more supervised and/or unsupervised learning algorithms. For example, the machine learning model 602 may be implemented in the form of a linear regression model, a logistic regression model, a Support Vector Machine (SVM) model, and/or other learning models. Additionally or alternatively, the machine learning model 602 may be implemented in the form of a neural network including an input layer, one or more hidden layers, and an output layer. Non-limiting examples of the neural network include, but are not limited to, Convolutional Neural Network (CNN), Recurrent Neural Network (RNN), Long Short-Term Memory (LSTM) neural network, etc. Other system architectures for implementing the machine learning model 602 are also possible and contemplated.

In some embodiments, the training system 600 may train the machine learning model 602 to detect an input device that belongs to the same input device category as the particular input device of the industrial machine 120 in video images. In other words, the training system 600 may train the machine learning model 602 to detect in a video image an input device that belongs to the input device category of the particular input device. In the description related to FIG. 6, the input device category of the particular input device may be referred to as the training category for simplification.

In some embodiments, the training system 600 may train the machine learning model 602 with a plurality of training examples 606-1 . . . 606-*n* (commonly referred to herein as training examples 606). As depicted in FIG. 6, each training example 606 may include an input image 608 and a target output 610 indicating a ground truth associated with the input image 608. For example, the input image 608 may depict various objects including an input device that belongs to the training category. For each object depicted in the input image 608, the target output 610 may indicate an actual position (e.g., image coordinates) of the object in the input image 608 and an actual category that the object belongs. For example, for the input device that belongs to the training category in the input image 608, the target output 610 may indicate an actual position (e.g., image coordinates) of the input device in the input image 608 and the training category that the input device actually belongs. In some embodiments, the input image 608 may be a video image depicting the particular input device associated with the training category that is captured by the on-premises robot 140 and collected by the TMMS 104 as described above. It should be understood that other images may also be used as the input images 608 in training examples 606.

In some embodiments, to train the machine learning model 602 with a training example 606 in a training cycle, the training system 600 may use the machine learning model 602 to generate a result output 612 for an input image 608 in the training example 606. For example, as depicted in FIG. 6, the training system 600 may provide the input image 608 to the machine learning model 602 as an input, and the machine learning model 602 may generate the result output 612 based on the input image 608. In some embodiments, the result output 612 may indicate one or more objects detected in the input image 608 by the machine learning model 602. For each detected object, the result output 612 may indicate the detected position of the object in the input image 608 and the predicted category of the object as determined by the machine learning model 602. The result output 612 may also include a confidence score indicating a level at which the machine learning model 602 is confident in the detected position and the predicted category of the object.

In some embodiments, the training system 600 may determine a feedback value 614 based on the result output 612 and the target output 610. For example, as depicted in FIG. 6, the training system 600 may provide the result output 612 generated by the machine learning model 602 and the target output 610 included in the training example 606 to the feedback computing unit 604. As described above, the result output 612 may indicate the detected position and the predicted category of each object detected in the input image 608 by the machine learning model 602. On the other hand, the target output 610 may indicate the actual position and the actual category of each object actually included in the input image 608.

In some embodiments, the feedback computing unit 604 may determine a feedback value 614 based on the result output 612 and the target output 610. For example, the feedback computing unit 604 may determine a first input device detected by the machine learning model 602 and a second input device indicated by the target output 610. The first input device may have its predicted category being the training category as determined by the machine learning model 602, and the second input device may have its actual category being the training category as indicated by the target output 610. In some embodiments, the feedback computing unit 604 may determine the difference between the detected position of the first the input device in the input image 608 as determined by the machine learning model 602 and the actual position of the second input device in the input image 608 as indicated by the target output 610, and determine the feedback value 614 to be the difference.

Additionally or alternatively, the feedback computing unit 604 may determine a first input device detected by the machine learning model 602 and a second input device indicated by the target output 610. The second input device may have its actual category being the training category as indicated by the target output 610, and the detected position of the first input device in the input image 608 as determined by the machine learning model 602 may match the actual position of the second input device in the input image 608 as indicated by the target output 610. In some embodiments, the feedback computing unit 604 may determine the difference between the predicted category of the first the input device as determined by the machine learning model 602 and the actual category of the second input device as indicated by the target output 610. For example, if the predicted category of the first the input device as determined by the machine learning model 602 matches the actual category of the second input device as indicated by the target output 610, the feedback computing unit 604 may determine the difference to be 0. Alternatively, if the predicted category of the first the input device as determined by the machine learning model 602 does not match the actual category of the second input device as indicated by the target output 610, the feedback computing unit 604 may determine the difference to be 1. The feedback computing unit 604 may then determine the feedback value 614 to be the difference. Other implementations for determining the feedback value 614 are also possible and contemplated.

In some embodiments, the training system 600 may adjust one or more model parameters of the machine learning model 602 based on the feedback value 614. For example, as depicted in FIG. 6, the training system 600 may back-propagate the feedback value 614 determined by the feedback computing unit 604 to the machine learning model 602, and adjust the model parameters of the machine learning model 602 based on the feedback value 614. For example, the training system 600 may adjust one or more values assigned to one or more coefficients of the machine learning model 602 based on the feedback value 614.

In some embodiments, the training system 600 may determine whether the model parameters of the machine learning model 602 have been sufficiently adjusted. For example, the training system 600 may determine that the machine learning model 602 has been subjected to a predefined number of training cycles (e.g., 3000 cycles). Therefore, the training system 600 may determine that the machine learning model 602 has been trained with a predefined number of training examples, and thus determine that the model parameters of the machine learning model 602 have been sufficiently adjusted. Additionally or alternatively, the training system 600 may determine that the feedback value 614 satisfies a predefined feedback value threshold, and thus determine that the model parameters of the machine learning model 602 have been sufficiently adjusted. Additionally or alternatively, the training system 600 may determine that the feedback value 614 remains unchanged for a predefined number of training cycles (e.g., 500 cycles), and thus determine that the model parameters of the machine learning model 602 have been sufficiently adjusted. Other implementations for determining whether the model parameters of the machine learning model 602 have been sufficiently adjusted are also possible and contemplated.

In some embodiments, in response to determining that the model parameters of the machine learning model 602 have been sufficiently adjusted, the training system 600 may determine that the machine learning model 602 is sufficiently trained, and therefore determine that the training session of the machine learning model 602 is completed. After the training session of the machine learning model 602 is completed, the machine learning model 602 may be additionally capable of detecting an input device that belongs to the training category in a video image, and the machine learning model 602 may be deployed in the TMMS 104 to replace a previous version of the machine learning model 602 that cannot detect an input device that belongs to the training category. As described herein, the training category may be the input device category of the particular input device that the user manually controls the on-premises robot 140 to interact with under the manual control mode. Thus, after the training session is completed, the machine learning model 602 may be capable of detecting in a video image an input device that belongs to the input device category of the particular input device.

In some embodiments, in addition to the training system 600 training the machine learning model 602 to detect an input device that belongs to the input device category of the particular input device, the TMMS 104 may identify a particular interaction operation to be performed on the input device that belongs to the input device category of the particular input device. In some embodiments, to determine the particular interaction operation, the TMMS 104 may determine the particular operations that are specified in the second user requests provided by the user when the user manually controls the on-premises robot 140 to interact with the particular input device under the manual control mode as described above. The TMMS 104 may then determine, from these particular operations, the particular interaction operation (e.g., the press-and-rotate operation) to be performed by the robotic hand of the on-premises robot 140 on the particular input device when the robotic hand of the on-premises robot 140 is in physical contact with the particular input device of the industrial machine 120. Thus, the TMMS 104 may determine the particular interaction operation that the user manually controls the on-premises robot 140 to perform on the particular input device to manipulate the particular input device.

In some embodiments, the TMMS 104 may store the particular interaction operation (e.g., the press-and-rotate operation) in a category profile of the input device category associated with the particular input device. The input device category associated with the particular input device may be a new input device category being created when the user manually controls the on-premises robot 140 to interact with the particular input device under the manual control mode. The new input device category may indicate the type of input device that the particular input device belongs (e.g., high current rotary switch) and may be referred to herein as the input device category of the particular input device. In some embodiments, the new input device category may have the category profile including various information about the type of input device to which the particular input device belongs. In some embodiments, the TMMS 104 may store the particular interaction operation (e.g., the press-and-rotate operation) in the category profile of the new input device category as an interaction operation to be performed on any input device that belongs to the new input device category. Thus, the TMMS 104 may store the particular interaction operation (e.g., the press-and-rotate operation) in the category profile of the input device category associated with the particular input device as an interaction operation to be performed on an input device that belongs to the same input device category as the particular input device. Accordingly, for an input device that belongs to the input device category of the particular input device, the TMMS 104 may reference the category profile of the new input device category, and identify the particular interaction operation (e.g., the press-and-rotate operation) to be performed on the input device to manipulate the input device.

Thus, as described above, when the user manually controls the on-premises robot 140 to interact with the particular input device of the industrial machine 120 under the manual control mode, the machine learning model implemented by the TMMS 104 may be trained to detect an input device that is similar to the particular input device and belongs to the same input device category as the particular input device in video images. The TMMS 104 may also determine the particular interaction operation that the user manually controls the on-premises robot 140 to perform on the particular input device to manipulate the particular input device, and include the particular interaction operation in the category profile of the input device category associated with the particular input device as an interaction operation to be performed on an input device that belongs to this input device category.

As a result of these training and determination, for an input device of an industrial machine 120 that is similar to the particular input device, the TMMS 104 may not only be able to detect the similar input device in a video image captured by the on-premises robot 140 and include the similar input device the list of input devices presented to the user, but also be able to determine the operations to be performed by the on-premises robot 140 to physically interact with the similar input device. As a result, the user may no longer need to manually control the on-premises robot 140 to interact with the similar input device that belongs to the same input device category as the particular input device. Instead, the user may simply select the similar input device in the list of input devices presented to the user. The TMMS 104 may then determine the operations (e.g., the arm movements, the particular interaction operation) to be performed by the on-premises robot 140 to reach the similar input device and manipulate the similar input device, and instruct the on-premises robot 140 to perform these operations. Thus, the user may not need to manually control the on-premises robot 140 to interact with the similar input device of the industrial machine 120 under the manual control mode. Instead, the user may control the on-premises robot 140 to interact with the similar input device of the industrial machine 120 under the automated control mode.

In some embodiments, the TMMS 104 may enable the user to control the on-premises robot 140 in addressing an unexpected event that the on-premises robot 140 experiences in the physical industrial facility 102. For example, the on-premises robot 140 may encounter a random object (e.g., a pallet, a box, etc.) while following a moving path provided by the TMMS 104 and may need assistance or instructions to address this unexpected event. In some embodiments, in response to the unexpected event that the on-premises robot 140 experiences in the physical industrial facility 102, the on-premises robot 140 may transmit an assistance request to the TMMS 104. The TMMS 104 may receive the assistance request from the on-premises robot 140, and present a robot assistance alert in the industrial digital twin 106 to the user accordingly. In some embodiments, in response to the robot assistance alert, the user may provide a first user request to enter the on-premises robot 140 in the manual control mode. The first user request may be provided via the industrial digital twin 106. In some embodiments, the TMMS 104 may receive the first user request provided by the user via the industrial digital twin 106 and enter the on-premises robot 140 in the manual control mode accordingly. As described herein, when the on-premises robot 140 operates in the manual control mode, the TMMS 104 may not determine the operations to be performed by the on-premises robot 140 to carry out a physical task. Instead, the user may specify the operations to be performed by the on-premises robot 140 to carry out the physical task in one or more user requests, and the TMMS 104 may instruct the on-premises robot 140 to perform the operations specified by the user.

In some embodiments, when the on-premises robot 140 operates in the manual control mode as a result of the first user request, the user may provide one or more second user requests specifying one or more particular operations to be performed by the on-premises robot 140 to address the unexpected event. For example, the user may view the video images captured by the on-premises robot 140 that are displayed to the user in the camera view associated with the on-premises robot 140 in the industrial digital twin 106, and thus the user may be informed of the context or the situation associated with the unexpected event that the on-premises robot 140 experiences. The user may then provide via the industrial digital twin 106 one or more second user requests, in which each second user request may specify one or more of the particular operations to be performed by the on-premises robot 140 to address the unexpected event. In some embodiments, the particular operations to address the unexpected event may include a set of operations such as a set of operations to relocate an object (e.g., move a box to a corner), a set of operations to navigate around an obstacle (e.g., move around a pallet), a set of operations to redirect to an alternative route (e.g., take a nearby ramp to avoid a stairway), and/or other operations to be performed by the on-premises robot 140 depending on the context or the situation of the unexpected event. In some embodiments, the particular operations may include one or more sequential movements to move to a specific location, one or more arm movements, one or more interaction operations, and/or other types of operations to be performed by the on-premises robot 140 to address the unexpected event.

In some embodiments, the TMMS 104 may receive the second user requests provided by the user and generate one or more particular control commands for the on-premises robot 140 based on the second user requests. For example, the TMMS 104 may generate the particular control commands instructing the on-premises robot 140 to perform the particular operations specified in the second user requests to address the unexpected event, and transmit the particular control commands to the on-premises robot 140 in the physical industrial facility 102. In response to receiving the particular control commands from the TMMS 104, the on-premises robot 140 may execute the particular control commands and perform the particular operations specified by the user, and thus the user may manually control the on-premises robot 140 to address the unexpected event.

In some embodiments, as the on-premises robot 140 executes the particular control commands to perform the particular operations and address the unexpected event, the user may view the video images captured by the on-premises robot 140 that are displayed to the user in the camera view associated with the on-premises robot 140 in the industrial digital twin 106. Thus, for one or more first operations being performed by the on-premises robot 140 to address the unexpected event, the user may monitor the performance of the first operations by the on-premises robot 140 via the camera view associated with the on-premises robot 140. The user may then determine one or more second operations to be performed by the on-premises robot 140 after the first operations to address the unexpected event, and provide a user request specifying the second operations via the industrial digital twin 106 as part of the second user requests.

As an example, for the unexpected event in which the on-premises robot 140 encounters a random object such as a box, the user may provide the second user requests in sequence. The second user requests may specify one or more particular operations to be performed by the on-premises robot 140 with its robotic arm and robotic hand to reach the box, grab the box, and pick up the box. The second user requests may also specify other particular operations to be performed by the on-premises robot 140 to subsequently move to the corner while carrying the box and place the box at the corner. For each user request among the second user requests provided by the user in sequence, the TMMS 104 may generate a particular control command instructing the premises robot 140 to perform one or more first operations specified in the user request, and transmit the particular control command to the on-premises robot 140 as described above. After the on-premises robot 140 executes the particular control command and performs the first operations, the on-premises robot 140 transmit a notification to the TMMS 104 indicating that the first operations specified in the particular control command have been performed. In response to this notification, the TMMS 104 may present in the industrial digital twin 106 a completion notification to the user indicating that the first operations specified in the user request have been performed and the user request is completed.

At this point, the user may provide a subsequent user request via the industrial digital twin 106 as part of the second user requests. The subsequent user request may specify one or more second operations to be performed by the on-premises robot 140 after the first operations to address the unexpected event. The TMMS 104 may then generate an additional control command for the on-premises robot 140 based on the subsequent user request, and the on-premises robot 140 may execute the additional control command to perform the second operations accordingly. Thus, by sequentially providing the second user requests via the industrial digital twin 106 in which each second user request specifies one or more of the particular operations to be sequentially performed by the on-premises robot 140, the user may manually control the on-premises robot 140 through the industrial digital twin 106 and cause the on-premises robot 140 to address the unexpected event in the physical industrial facility 102. Accordingly, even if the user is located remotely from the physical industrial facility 102, the user may still control the on-premises robot 140 under the manual control mode to address the unexpected event that the on-premises robot 140 experiences in the physical industrial facility 102. As a result, the on-premises robot 140 may operate in the physical industrial facility 102 in an effective manner and may be used to facilitate the industrial operations in the physical industrial facility 102, especially when human presence in the physical industrial facility 102 is restricted for safety reasons (e.g., during a pandemic or during a natural disaster).

Embodiments, systems, and components described herein, as well as control systems and automation environments in which various aspects set forth in the present disclosure may be carried out, may include computer or network components such as servers, clients, programmable logic controllers (PLCs), automation controllers, communications modules, mobile computers, on-board computers for mobile vehicles, wireless components, control components and so forth which are capable of interacting across a network. Computers and servers may include one or more processors (e.g., electronic integrated circuits that perform logic operations using electric signals) configured to execute instructions stored in media such as random access memory (RAM), read only memory (ROM), hard drives, as well as removable memory devices (e.g., memory sticks, memory cards, flash drives, external hard drives, etc.).

Similarly, the term PLC or automation controller as used herein may include functionality that can be shared across multiple components, systems, and/or networks. As an example, one or more PLCs or automation controllers may communicate and cooperate with various network devices across the network. These network devices may include any type of control, communications module, computer, Input/Output (I/O) device, sensor, actuator, and human machine interface (HMI) that communicate via the network, which includes control, automation, and/or public networks. The PLC or automation controller may also communicate with and may control other devices such as standard or safety-rated I/O modules including analog, digital, programmed/intelligent I/O modules, other programmable controllers, communication modules, sensors, actuators, output devices, and the like.

The network may include public networks such as the Internet, intranets, and automation networks such as control and information protocol (CIP) networks including DeviceNet, ControlNet, safety networks, and Ethernet/IP. Other networks may include Ethernet, DH/DH+, Remote I/O, Fieldbus, Modbus, Profibus, CAN, wireless networks, serial protocols, etc. In addition, the network devices may include various possibilities (hardware and/or software components). The network devices may also include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 7:
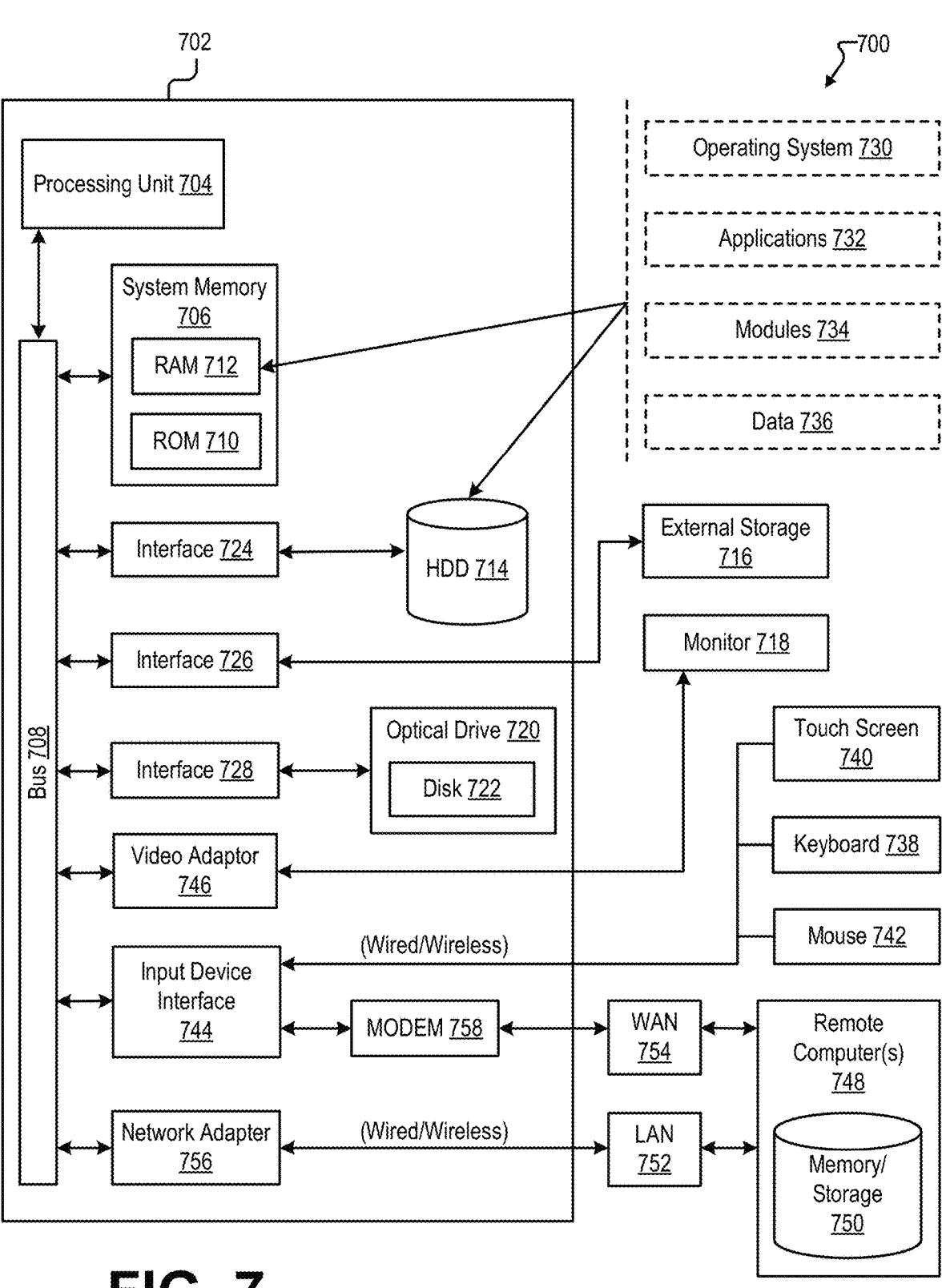
FIG. 7 illustrates an example computing environment.
Figure 8:
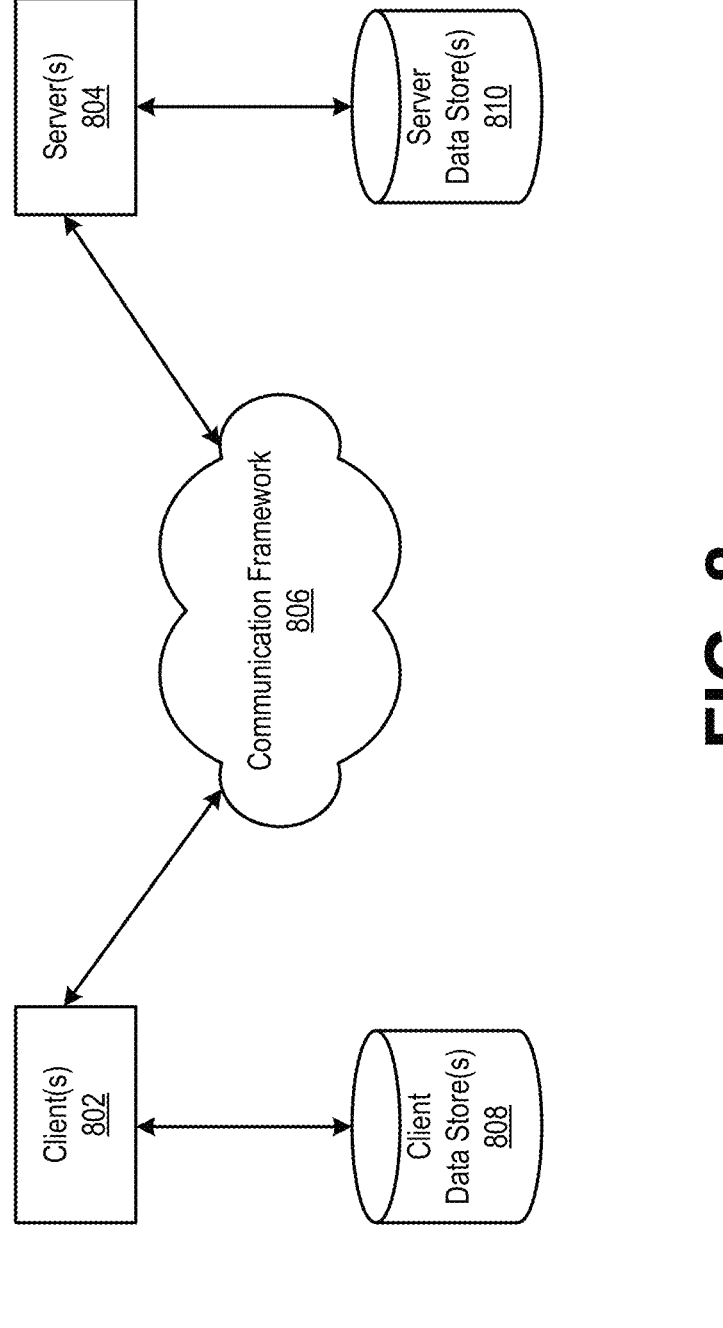
FIG. 8 illustrates an example networking environment.

To provide a context for various aspects of the present disclosure, FIGS. 7 and 8 illustrate an exemplary environment in which various aspects of the present disclosure may be implemented. While the embodiments are described herein in the general context of computer-executable instructions that can be executed on one or more computers, it should be understood that the embodiments may also be implemented in combination with other program modules and/or implemented as a combination of hardware and software.

The program modules may include routines, programs, components, data structures, etc., that perform particular tasks or may implement particular abstract data types. Moreover, it should be understood that the methods described herein may be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which may be operatively coupled to one or more associated devices.

The exemplary embodiments described herein may also be practiced in distributed computing environments where certain tasks may be performed by remote processing devices that are linked through a communications network. In a distributed computing environment, program modules may be located in both local and remote memory storage devices.

Computing devices may include a variety of media, which may include computer-readable storage media, machine-readable storage media, and/or communications media. Computer-readable storage media or machine-readable storage media may be any available storage media that can be accessed by the computer and may include both volatile and nonvolatile media, removable and non-removable media. By way of example and not limitation, computer-readable storage media or machine-readable storage media may be implemented in connection with any method or technology for storage of information such as computer-readable or machine-readable instructions, program modules, structured data or unstructured data. Computer-readable storage media may be accessed by one or more local or remote computing devices (e.g., via access requests, queries, or other data retrieval protocols) for various operations with respect to the information stored in the computer-readable storage media.

Examples of computer-readable storage media may include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage, or other magnetic storage devices, or other solid state storage devices, or other tangible and/or non-transitory media, which may be used to store desired information. The terms "tangible" or "non-transitory" as applied to storage, memory or computer-readable media herein, should be understood to exclude only propagating transitory signals per se as modifiers and do not relinquish rights to all standard storage, memory, or computer-readable media that are not only propagating transitory signals per se.

Communications media may embody computer-readable instructions, data structures, program modules, or other structured or unstructured data in a data signal such as a modulated data signal (e.g., a carrier wave or other transport mechanism) and may include any information delivery or transport media. The term "modulated data signal" or signals refers to a signal that has one or more of its characteristics set or changed to encode information in one or more signals. By way of example and not limitation, communication media may include wired media (e.g., a wired network or direct-wired connection) and wireless media (e.g., acoustic, RF, infrared, etc.).

FIG. 7 illustrates an example environment 700 for implementing various embodiments of the aspects described herein. For example, the environment 700 may implement the system 100, the TMMS 104, the training system 600, and/or other systems and their components described herein. As depicted in FIG. 7, the environment 700 may include a computing device 702. The computing device 702 may include a processing unit 704, a system memory 706, and a system bus 708. The system bus 708 may couple various system components such as the system memory 706 to the processing unit 704. The processing unit 704 may be any commercially available processor. Dual microprocessors and other multi-processor architectures may also be used as the processing unit 704.

The system bus 708 may be a bus structure that can further interconnect to a memory bus (with or without a memory controller), a peripheral bus, and/or a local bus using any commercially available bus architecture. The system memory 706 may include ROM 710 and RAM 712. A basic input/output system (BIOS) may be stored in a non-volatile memory such as ROM, erasable programmable read only memory (EPROM), EEPROM, etc. BIOS may contain the basic routines for transferring information between elements in the computing device 702, such as during startup. The RAM 712 may also include a high-speed RAM such as static RAM for caching data.

The computing device 702 may additionally include an internal hard disk drive (HDD) 714 (e.g., EIDE, SATA), one or more external storage devices 716 (e.g., a magnetic floppy disk drive (FDD), a memory stick or flash drive reader, a memory card reader, etc.), and an optical disk drive 720 (which may read or write from a CD-ROM disc, a DVD, a BD, etc.). While the internal HDD 714 is illustrated as located within the computing device 702, the internal HDD 714 may also be configured for external use in a suitable chassis (not shown). Additionally, while not shown in the environment 700, a solid state drive (SSD) may be used in addition to, or in place of, the HDD 714. The HDD 714, external storage device(s) 716, and optical disk drive 720 may be connected to the system bus 708 by an HDD interface 724, an external storage interface 726, and an optical drive interface 728, respectively. The interface 724 for external drive implementations may include at least one or both of Universal Serial Bus (USB) and Institute of Electrical and Electronics Engineers (IEEE) 1394 interface technologies. Other external drive connection technologies are also possible and contemplated.

The drives and their associated computer-readable storage media may provide nonvolatile storage of data, data structures, computer-executable instructions, etc. In the computing device 702, the drives and storage media may accommodate the storage of any data in a suitable digital format. Although the description of computer-readable storage media above refers to respective types of storage devices, it should be understood that other types of storage media which are readable by a computer, whether presently existing or developed in the future, may also be used in the example operating environment 700, and that any such storage media may contain computer-executable instructions for performing the methods described herein.

A number of program modules may be stored in the drives and RAM 712, including an operating system 730, one or more application programs 732, other program modules 734, and program data 736. All or portions of the operating system 730, the applications 732, the modules 734, and/or the data 736 may also be cached in the RAM 712. The systems and methods described herein may be implemented using various operating systems or combinations of operating systems that are commercially available.

The computing device 702 may optionally include emulation technologies. For example, a hypervisor (not shown) or other intermediary may emulate a hardware environment for the operating system 730, and the emulated hardware may optionally be different from the hardware illustrated in FIG. 7. In such an embodiment, the operating system 730 may comprise one virtual machine (VM) of multiple VMs hosted on the computing device 702. Furthermore, the operating system 730 may provide runtime environments (e.g., the Java runtime environment or the .NET framework) for the application programs 732. The runtime environments may be consistent execution environments that allow application programs 732 to run on any operating system that includes the runtime environment. Similarly, the operating system 730 may support containers, and application programs 732 may be in the form of containers, which are lightweight, standalone, executable packages of software that include code, runtime, system tools, system libraries, settings, and/or other components for executing an application.

In addition, the computing device 702 may be enable with a security module, such as a trusted processing module (TPM). For example, with a TPM, boot components may hash next-in-time boot components, and wait for a match of results to secured values, before loading a next boot component. This process may take place at any layer in the code execution stack of the computing device 702 (e.g., applied at the application execution level or at the operating system (OS) kernel level) thereby enabling security at any level of code execution.

A user may enter commands and information into the computing device 702 through one or more wired/wireless input devices (e.g., a keyboard 738, a touch screen 740, and a pointing device, such as a mouse 742). Other input devices (not shown) may include a microphone, an infrared (IR) remote control, a radio frequency (RF) remote control, or other remote control, a joystick, a virtual reality controller and/or virtual reality headset, a game pad, a stylus pen, an image input device (e.g., one or more cameras), a gesture sensor input device, a vision movement sensor input device, an emotion or facial detection device, a biometric input device (e.g., fingerprint or iris scanner), etc. These input devices and other input devices may be connected to the processing unit 704 through an input device interface 744 that may be coupled to the system bus 708, but may be connected by other interfaces, such as a parallel port, an IEEE 1394 serial port, a game port, a USB port, an IR interface, a BLUETOOTH® interface, etc.

A monitor 718 or other type of display device may be also connected to the system bus 708 via an interface, such as a video adapter 746. In addition to the monitor 718, the computing device 702 may also include other peripheral output devices (not shown), such as speakers, printers, etc.

The computing device 702 may operate in a networked environment using logical connections via wired and/or wireless communications to one or more remote computers, such as remote computer(s) 748. The remote computer(s) 748 may be a workstation, a server computer, a router, a personal computer, portable computer, microprocessor-based entertainment appliance, a peer device, or other common network node. The remote computer(s) 748 may include many or all of the elements in the computing device 702 although only a memory/storage device 750 is illustrated for purposes of brevity. As depicted in FIG. 7, the logical connections of remote computer(s) 748 may include wired/wireless connectivity to a local area network (LAN) 752 and/or to larger networks such as a wide area network (WAN) 754. Such LAN and WAN networking environments may be commonplace in offices and companies, and may facilitate enterprise-wide computer networks (e.g., intranets) all of which may connect to a global communications network (e.g., the Internet).

When used in a LAN networking environment, the computing device 702 may be connected to the local network 752 through a wired and/or wireless communication network interface or adapter 756. The adapter 756 may facilitate wired or wireless communication to the LAN 752, which may also include a wireless access point (AP) disposed thereon for communicating with the adapter 756 in a wireless mode.

When used in a WAN networking environment, the computing device 702 may include a modem 758 or may be connected to a communication server on the WAN 754 via other means to establish communication over the WAN 754, such as by way of the Internet. The modem 758, which may be internal or external and a wired or wireless device, may be connected to the system bus 708 via the input device interface 744. In a networked environment, program modules that are depicted relative to the computing device 702 or portions thereof, may be stored in the remote memory/storage device 750. It should be understood that the network connections depicted in FIG. 7 are merely example and other implementations to establish a communication link between the computers/computing devices are also possible and contemplated.

When used in either a LAN or WAN networking environment, the computing device 702 may access cloud storage systems or other network-based storage systems in addition to, or in place of, the external storage devices 716 as described herein. In some embodiments, a connection between the computing device 702 and a cloud storage system may be established over the LAN 752 or WAN 754 (e.g., by the adapter 756 or the modem 758, respectively). Upon connecting the computing device 702 to an associated cloud storage system, the external storage interface 726 may, with the aid of the adapter 756 and/or the modem 758, manage the storage provided by the cloud storage system as it would for other types of external storage. For example, the external storage interface 726 may be configured to provide access to cloud storage resources as if those resources were physically connected to the computing device 702.

The computing device 702 may be operable to communicate with any wireless devices or entities operatively disposed in wireless communication such as a printer, scanner, desktop and/or portable computer, portable data assistant, communications satellite, any piece of equipment or location associated with a wirelessly detectable tag (e.g., a kiosk, news stand, store shelf, etc.), telephone, etc. This communication may use Wireless Fidelity (Wi-Fi) and BLUETOOTH® wireless technologies. Thus, the communication may be a predefined structure as in a conventional network or simply an ad hoc communication between at least two devices.

FIG. 8 illustrates an exemplary computing environment 800 with which the embodiments described herein may be implemented. The computing environment 800 may include one or more client(s) 802. The client(s) 802 may be hardware and/or software (e.g., threads, processes, computing devices). The computing environment 800 may also include one or more server(s) 804. The server(s) 804 may also be hardware and/or software (e.g., threads, processes, computing devices). For example, the servers 804 may house threads that implement one or more embodiments described herein. One possible communication between a client 802 and servers 804 may be in the form of a data packet adapted to be transmitted between two or more computer processes. The computing environment 800 may include a communication framework 806 that may facilitate communications between the client(s) 802 and the server(s) 804. The client(s) 802 may be operably connected to one or more client data store(s) 808 that may be used to store information local to the client(s) 802. Similarly, the server(s) 804 may be operably connected to one or more server data store(s) 810 that may be used to store information local to the servers 804.

The foregoing description has been presented for the purposes of illustration and description. It is not intended to be exhaustive or to limit the specification to the precise form disclosed. Many modifications and variations are possible in light of the above teaching. It is intended that the scope of the disclosure is not limited by this detailed description and the modifications and variations that fall within the spirit and scope of the appended claims are included. As will be understood by those familiar with the art, the specification may be embodied in other specific forms without departing from the spirit or essential characteristics thereof.

In particular and with regard to various functions performed by the above-described components, devices, circuits, systems, and/or the like, the terms (including a reference to a "means") used to describe such components are intended to correspond, unless otherwise indicated, to any component which performs the specified function of the described component (e.g., a functional equivalent), even if such component may not be structurally equivalent to the described structure, which illustrates exemplary aspects of the present disclosure. In this regard, it should also be recognized that the present disclosure includes a system as well as a computer-readable medium having computer-executable instructions for performing the acts and/or events of various methods described herein.

In addition, while a particular feature of the present disclosure may have been disclosed with respect to only one of several implementations, such feature may be combined with one or more other features of the other implementations as may be desired and advantageous for a given application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Instead, the use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from a computer-readable device, carrier, or media. For example, computer readable media may include, but are not limited to, magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.).

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:

presenting, by a twin model management system, a video stream captured by an on-premises robot in a physical industrial facility, wherein the video stream is presented in an industrial digital twin of the physical industrial facility to a user;

receiving, by the twin model management system, a user request to select an input device of an industrial machine, wherein the user request is provided by the user via the industrial digital twin when the industrial machine is depicted in the video stream;

providing, by the twin model management system in response to the user request, a list of input devices indicating one or more input devices of the industrial machine that are depicted in a particular video image of the video stream, the list of input devices being presented in the industrial digital twin to the user;

receiving, by the twin model management system, a user selection specifying a target input device in the list of input devices, the user selection being provided by the user via the industrial digital twin;

generating, by the twin model management system in response to the user selection of the target input device, one or more control commands specifying one or more operations to be performed by the on-premises robot to physically interact with the target input device of the industrial machine, and wherein generating the one or more control commands comprises:

determining a relative location of the target input device relative to a robotic arm of the on-premises robot;

determining, based on the relative location of the target input device relative to the robotic arm of the on-premises robot, one or more arm movements for the robotic arm of the on-premise robot to reach the target input device; and generating the one or more control commands instructing the on-premises robot to perform the one or more arm movements; and transmitting, by the twin model management system, the one or more control commands to the on-premises robot in the physical industrial facility.

2. The method of claim 1, wherein:

the industrial digital twin is a virtual model of the physical industrial facility; and the industrial digital twin is presented to the user in a form of a virtual environment that dynamically reflects the physical industrial facility.

3. The method of claim 1, wherein providing the list of input devices includes:

inputting the particular video image of the video stream into a machine learning model to detect the one or more input devices of the industrial machine that are depicted in the particular video image and determine an input device category of each input device among the one or more input devices.

4. The method of claim 3, wherein providing the list of input devices includes:

assigning an input device identifier for each input device among the one or more input devices; and generating the list of input devices including the input device identifier of each input device.

5. The method of claim 3, wherein providing the list of input devices includes:

generating a display image based on the particular video image, wherein the display image includes an input device identifier of each input device among the one or more input devices; and presenting the display image and the list of input devices in the industrial digital twin to the user.

6. The method of claim 5, wherein generating the display image based on the particular video image includes one or more of:

adding one or more graphical elements to the particular video image to respectively indicate each input device among the one or more input devices; and adding the input device identifier of each input device to the particular video image at a position relative to a position of the input device in the particular video image.

7. The method of claim 1, wherein determining the location of the target input device relative to the robotic arm of the on-premises robot includes:

determining one or more relative positions of the target input device in one or more video images of the video stream that are captured by a robot camera of the on-premises robot;

determining a relative location of the target input device relative to the robot camera of the on-premises robot based on the one or more relative positions of the target input device in the one or more video images;

determining a relative location of the robotic arm of the on-premises robot relative to the robot camera of the on-premises robot; and determining the relative location of the target input device relative to the robotic arm of the on-premises robot based on the relative location of the target input device relative to the robot camera of the on-premises robot and the relative location of the robotic arm of the on-premises robot relative to the robot camera of the on-premises robot.

8. The method of claim 1, wherein generating the one or more control commands includes:

updating the relative location of the target input device relative to the robotic arm of the on-premises robot when the on-premises robot performs the one or more arm movements;

determining, based on the updated relative location of the target input device relative to the robotic arm of the on-premises robot, one or more different arm movements for the robotic arm of the on-premises robot to reach the target input device; and generating one or more second control commands instructing the on-premises robot to stop performing the one or more arm movements and perform the one or more different arm movements.

9. The method of claim 1, comprising generating an additional control command, comprising:

determining, based on one or more of the particular video image and data associated with the industrial machine, one or more of an input device category of the target input device and a current state of the target input device;

determining, based on one or more of the input device category of the target input device and the current state of the target input device, an interaction operation to be performed by a robotic hand of the on-premises robot on the target input device; and generating the additional control command instructing the on-premises robot to perform the interaction operation on the target input device using the robotic hand of the on-premises robot when the robotic hand of the on-premises robot is in physical contact with the target input device.

10. The method of claim 1, further comprising:

receiving, by the twin model management system and subsequent to the on-premises robot executing the one or more control commands to physically interact with the target input device of the industrial machine, data associated with the industrial machine, the data indicating a change of the industrial machine caused by the on-premises robot executing the one or more control commands; and updating, by the twin model management system, the industrial digital twin based on the data associated with the industrial machine to reflect the change of the industrial machine in the industrial digital twin.

11. The method of claim 1, further comprising:

receiving, by the twin model management system, a first user request to enter the on-premises robot in a manual control mode, wherein the first user request is provided by the user via the industrial digital twin when a particular input device of the industrial machine is depicted in the particular video image and a machine learning model implemented by the twin model management system does not detect the particular input device in the particular video image;

entering, by the twin model management system in response to the first user request, the on-premises robot in the manual control mode;

receiving, by the twin model management system when the on-premises robot operates in the manual control mode, one or more second user requests from the user specifying one or more particular operations to be performed by the on-premises robot to physically interact with the particular input device of the industrial machine;

generating, by the twin model management system, one or more particular control commands instructing the on-premises robot to perform the one or more particular operations specified in the one or more second user requests to physically interact with the particular input device of the industrial machine; and transmitting, by the twin model management system, the one or more particular control commands to the on-premises robot in the physical industrial facility.

12. The method of claim 11, further comprising:

identifying, by the twin model management system, a reference image in the video stream that depicts a robotic hand of the on-premises robot being proximate to the particular input device when the on-premises robot executes the one or more particular control commands to physically interact with the particular input device;

determining, by the twin model management system, an input device appearance of the particular input device in the reference image;

identifying, by the twin model management system, one or more video images in the video stream that depict the particular input device based on the input device appearance of the particular input device; and providing, by the twin model management system, the one or more video images in the video stream as training data to train the machine learning model in detecting an input device that belongs to a same input device category as the particular input device.

13. The method of claim 11, further comprising:

determining, by the twin model management system and from the one or more particular operations specified in the one or more second user requests, a particular interaction operation to be performed by a robotic hand of the on-premises robot on the particular input device when the robotic hand of the on-premises robot is in physical contact with the particular input device; and storing, by the twin model management system, the particular interaction operation in a category profile of an input device category associated with the particular input device as an interaction operation to be performed on an input device that belongs to the same input device category as the particular input device.

14. The method of claim 1, further comprising:

receiving, by the twin model management system, an assistance request from the on-premises robot in response to an unexpected event that the on-premises robot experiences in the physical industrial facility;

presenting, by the twin model management system in response to the assistance request, a robot assistance alert in the industrial digital twin to the user;

receiving, by the twin model management system in response to the robot assistance alert, a first user request to enter the on-premises robot in a manual control mode;

entering, by the twin model management system in response to the first user request, the on-premises robot in the manual control mode;

receiving, by the twin model management system when the on-premises robot operates in the manual control mode, one or more second user requests from the user specifying one or more particular operations to be performed by the on-premises robot to address the unexpected event;

generating, by the twin model management system, one or more particular control commands instructing the on-premises robot to perform the one or more particular operations specified in the one or more second user requests to address the unexpected event; and transmitting, by the twin model management system, the one or more particular control commands to the on-premises robot in the physical industrial facility.

15. The method of claim 14, wherein:

the one or more particular operations specified in the one or more second user requests include one or more of a set of operations to navigate around an obstacle, a set of operations to relocate an object, or a set of operations to redirect to an alternative route.

16. A system comprising:

a memory storing instructions; and a processor communicatively coupled to the memory and configured to execute the instructions to:

present a video stream captured by an on-premises robot in a physical industrial facility, wherein the video stream is presented in an industrial digital twin of the physical industrial facility to a user;

receive a user request to select an input device of an industrial machine, wherein the user request is provided by the user via the industrial digital twin when the industrial machine is depicted in the video stream;

provide, in response to the user request, a list of input devices indicating one or more input devices of the industrial machine that are depicted in a particular video image of the video stream, the list of input devices being presented in the industrial digital twin to the user;

receive a user selection specifying a target input device in the list of input devices, the user selection being provided by the user via the industrial digital twin;

generate, in response to the user selection of the target input device, one or more control commands specifying one or more operations to be performed by the on-premises robot to physically interact with the target input device of the industrial machine, wherein generating the one or more commands comprises:

determining a relative location of the target input device relative to a robotic arm of the on-premises robot;

determining, based on the relative location of the target input device relative to the robotic arm of the on-premises robot, one or more arm movements for the robotic arm of the on-premises robot to reach the target input device;

generating the one or more control commands instructing the on-premises robot to perform the one or more arm movements; and transmit the one or more control commands to the on-premises robot in the physical industrial facility.

17. The system of claim 16, wherein the processor is further configured to execute the instructions to generate an additional control command, comprising:

determining, based on one or more of the particular video image and data associated with the industrial machine, one or more of an input device category of the target input device and a current state of the target input device;

determining, based on one or more of the input device category of the target input device and the current state of the target input device, an interaction operation to be performed by a robotic hand of the on-premises robot on the target input device; and generating the additional control command instructing the on-premises robot to perform the interaction operation on the target input device using the robotic hand of the on-premises robot when the robotic hand of the on-premises robot is in physical contact with the target input device.

18. A non-transitory computer-readable medium storing instructions that, when executed, direct a processor of a computing device to:

present a video stream captured by an on-premises robot in a physical industrial facility, wherein the video stream is presented in an industrial digital twin of the physical industrial facility to a user;

receive a user request to select an input device of an industrial machine, wherein the user request is provided by the user via the industrial digital twin when the industrial machine is depicted in the video stream;

provide, in response to the user request, a list of input devices indicating one or more input devices of the industrial machine that are depicted in a particular video image of the video stream, the list of input devices being presented in the industrial digital twin to the user;

receive a user selection specifying a target input device in the list of input devices, the user selection being provided by the user via the industrial digital twin;

generate, in response to the user selection of the target input device, one or more control commands specifying one or more operations to be performed by the on-premises robot to physically interact with the target input device of the industrial machine, and wherein generating the one or more commands comprises:

determining a relative location of the target input device relative to a robotic arm of the on-premises robot;

determining, based on the relative location of the target input device relative to the robotic arm of the on-premises robot, one or more arm movements for the robotic arm of the on-premises robot to reach the target input device; and generating the one or more control commands instructing the on-premises robot to perform the one or more arm movements; and transmit the one or more control commands to the on-premises robot in the physical industrial facility.

* * * * *